(12) United States Patent
Huang et al.

(10) Patent No.: US 11,593,097 B2
(45) Date of Patent: Feb. 28, 2023

(54) GUIDED SAFETY ANALYSIS FOR CYBER PHYSICAL SYSTEMS

(71) Applicant: University of Notre Dame du Lac, South Bend, IN (US)

(72) Inventors: Jane Huang, Granger, IN (US); Michael Vierhauser, Linz (AT); Ankit Agrawal, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 1 day.

(21) Appl. No.: 17/272,650

(22) PCT Filed: Oct. 15, 2019

(86) PCT No.: PCT/US2019/056316
§ 371 (c)(1),
(2) Date: Mar. 1, 2021

(87) PCT Pub. No.: WO2020/081558
PCT Pub. Date: Apr. 23, 2020

(65) Prior Publication Data
US 2021/0342144 A1 Nov. 4, 2021

Related U.S. Application Data

(60) Provisional application No. 62/747,208, filed on Oct. 18, 2018.

(51) Int. Cl.
*G06F 9/44* (2018.01)
*G06F 8/71* (2018.01)
*G06F 11/36* (2006.01)

(52) U.S. Cl.
CPC ........... *G06F 8/71* (2013.01); *G06F 11/3684* (2013.01)

(58) Field of Classification Search
None
See application file for complete search history.

(56) References Cited

U.S. PATENT DOCUMENTS 7,958,486 B2 * 6/2011 Tsyganskiy ............... G06F 8/72
715/713
8,195,709 B2 * 6/2012 Pulfer ..................... G06Q 10/06
707/802

(Continued)

FOREIGN PATENT DOCUMENTS

WO 2014130015 A1 8/2014

OTHER PUBLICATIONS

Cleland-Huang et al., "Trace Queries for Safety Requirements in High Assurance Systems", Proceedings of the 18th International Conference on Requirements Engineering: foundation for software quality, 2012 (Year: 2012).*

(Continued)

*Primary Examiner* — Wei Y Zhen
*Assistant Examiner* — Lanny N Ung
(74) *Attorney, Agent, or Firm* — Michael Best & Friedrich LLP

(57) ABSTRACT

Systems and methods for maintaining the safety of a software-based system. One method includes automatically generating a first artifact tree for a hazard for a first version of the system and automatically transforming the first artifact tree into a first augmented tree using a set of heuristics. The method also includes automatically generating a second artifact tree for the hazard for a second version of the system and automatically transforming the second artifact tree for the hazard into a second augmented tree using the set of heuristics. The method further includes automatically comparing the first augmented tree and the second augmented tree to generate a delta view, and automatically generating, based on the delta view, at least one selected from a group (Continued)

consisting of a safety warning for the second version of the software-based system and an actionable recommendation to maintain safety of the second version of the software-based system.

20 Claims, 15 Drawing Sheets

(56) References Cited

U.S. PATENT DOCUMENTS

| | | | | |
|---|---|---|---|---|
| 8,984,485 | B2* | 3/2015 | Elshishiny | G06F 11/3676 |
| | | | | 717/124 |
| 9,311,219 | B2 | 4/2016 | Berenbach et al. | |
| 9,471,304 | B1* | 10/2016 | Fuchs | G06F 8/71 |
| 2010/0023919 | A1 | 1/2010 | Chaar et al. | |
| 2013/0006702 | A1 | 1/2013 | Wu | |
| 2013/0227517 | A1 | 8/2013 | Fox et al. | |
| 2014/0282145 | A1* | 9/2014 | Dewan | G06F 3/0481 |
| | | | | 715/765 |
| 2018/0137038 | A1 | 5/2018 | Huang et al. | |
| 2020/0103871 | A1* | 4/2020 | Laycock | G06Q 50/04 |

OTHER PUBLICATIONS

International Search Report and Written Opinion for Application No. PCT/US19/056316 dated Jan. 14, 2020 (10 pages).

International Preliminary Report on Patentability for Application No. PCT/US2019/056316 dated Apr. 14, 2021 (8 pages).

Cleland-Huang et al., "Software Traceability: Trends and Future Directions", ICSE, 2014, 15 pages.

Cleland-Huang et al., "Event-Based Traceability for Managing Evolutionary Change", IEEE Transactions on Software Engineering, 2003, vol. 29, No. 9, pp. 796-810.

Cleland-Huang et al., "Grand Challenges, Benchmarks, and TraceLab: Developing Infrastructure for the Software Traceability Research Community", TEFSE, 2011, pp. 17-23.

Cleland-Huang et al., "Supporting Event Based Traceability through High-Level Recognition of Change Events", International Center for Software Engineering, 2002, 8 pages.

Cleland-Huang et al., "Trace Queries for Safety Requirements in High Assurance Systems", Proceedings of the 18th International Conference on Requirements Engineering: foundation for software quality, 2012, 16 pages.

Guo et al., "Semantically Enhanced Software Traceability Using Deep Learning Techniques", IEEE Xplore, 2018, 12 pages.

Mader et al., "A visual language for modeling and executing traceability queries", Softw Syst Model, 2012, 17 pages.

European Patent Office Extended Search Report for Application No. 19873696.9 dated Jul. 8, 2022 (12 pages).

Agrawal et al., "Leveraging Artifact Trees to Evolve and Reuse Safety Cases", IEEE/ACM 41st International Conference on Software Engineering, 2019, pp. 1222-1233.

* cited by examiner

GUIDED SAFETY ANALYSIS FOR CYBER PHYSICAL SYSTEMS

RELATED APPLICATIONS

This application is a U.S. national stage entry of International Patent Application No. PCT/US2019/056316, filed on Oct. 15, 2019, which claims priority to U.S. Provisional Patent Application No. 62/747,208, filed on Oct. 18, 2018, the entire contents of each of which are hereby incorporated by reference.

GOVERNMENT LICENSE RIGHTS

This invention was made with government support under Grant No. CCF1647342 awarded by the National Science Foundation. The government has certain rights in the invention.

FIELD

Embodiments described herein relate to systems and methods for building and maintaining safety cases for software through a series of releases or versions of the software.

SUMMARY

Software-intensive systems can contain sub-systems that interact with or control Cyber-Physical Systems (CPS) and, therefore, often have safety-critical implications. Examples of such systems include medical devices, unmanned aerial vehicle (UAV) applications, autonomous vehicles or robots, or the like. Failures in the software, physical components, or their interfaces could results in physical harm or significant financial loss. Therefore, software operating in such environments is designed to mitigate potential hazards. In many domains, specific development processes and artifacts are prescribed—and software is certified or approved as safe for use prior to its deployment. This is typically achieved by identifying hazards to be mitigated and then using traceability to demonstrate that each hazard has been addressed through the requirements, design, and implementation, and that sufficient (and diverse) evidence is provided in the form of test cases, models, simulations, and the like. Achieving this level of traceability is usually an arduous task as it can require significant effort for establishing trace links between related artifacts. Existing tools typically store and display these trace links between source and target artifacts in the form of so called "trace matrices" (for example, as spreadsheets). Data in the matrices can be visualized as trace slices (trees that originate at the hazard and trace through to the source code and test cases). Most current tools on the market only provide rudimentary visualization support requiring organizations to augment these by implementing their own scripts and extensions to generate the views they desire.

When a new version of the system is produced (new features are added or a new product is derived from a product line) trace links need to be updated accordingly and the entire process is repeated. Typically, the cost of re-certifying a modified version of a product can be very high—leading to the phenomenon known as the "big freeze" where entities opt to maintain a set of existing features rather than developing new functionality due to the high costs associated with recertification. This in turn limits the ability of an organization to innovate and release new features. The primary challenges are to determine what has changed in the system since its previous release, how that change impacts safety, how the system needs to be changed to address safety concerns, and finally to update the safety case accordingly.

As described herein, embodiments described herein aid a user (for example, a safety analyst) in (1) developing a safety case for an existing system, (2) identifying changes that impact safety, and (3) recommending steps to help them achieve safety and to update the safety case. In particular, as described herein, embodiments described herein use Safety Artifact Forest Analysis (SAFA) to automatically identify an impact of a change (a system-wide change) on a previously approved or certified safety assurance case (SAC) to facilitate evolution and safe reuse of a SAC's elements within the context of a new version of the system. Sample A included in FIG. 1 illustrates example trees generated as part of an SAFA according to some embodiments (it should be understood that FIG. 1 illustrates one tree of a safety forest, as a forest includes multiple trees, each one originating from a hazard). Accordingly, as compared to existing requirements management tools that merely generate rudimentary (in terms of visualization) trace slices (or trees) depicting traces from any type of artifact via other artifacts to leaf nodes, embodiments described herein (1) facilitate comparison of trace trees across two versions (a previously certified version and a new version) and generate a delta tree highlighting changes (See Sample B included in FIG. 2); (2) augment the trace tree by injecting warnings and advices highlight any (zero or more) problems in achieving safety and, moreover, recommend remediation steps that the user should take; and (3) mine source code repositories and requirements management systems for the project to analyze the changes and to provide an explanation which can help the user determine whether the change actually impacts safety.

For example, one embodiment provides a method for maintaining the safety of a software-based system. The method includes automatically generating a first artifact tree for a hazard for a first version of the software-based system by recursively following traceability paths defined by a model for a plurality of artifacts associated with mitigating the hazard, wherein the traceability paths represent links between the plurality of artifacts, and automatically transforming the first artifact tree into a first augmented tree using a set of heuristics, wherein the set of heuristics automatically inserts one or more augmentation nodes into the first artifact tree. The method also includes automatically generating a second artifact tree for the hazard for a second version of the software-based system by recursively following the traceability paths defined by the model and automatically transforming the second artifact tree for the hazard into a second augmented tree using the set of heuristics, wherein the set of heuristics automatically inserts one or more augmentation nodes into the second artifact tree. The method further includes automatically, with an electronic processor, comparing the first augmented tree and the second augmented tree to generate a delta view and automatically, with the electronic processor, generating at least one selected from a group consisting of a safety warning for the second version of the software-based system based on the delta view and an actionable recommendation based on the delta view to maintain safety of the second version of the software-based system.

Another embodiment provides a system for maintaining the safety of a software-based system. The system includes at least one electronic processor configured to automatically generate a first artifact tree for a hazard for a first version of the software-based system by recursively following traceability paths defined by a model for a plurality of artifacts associated with mitigating the hazard, wherein the traceability paths represent links between the plurality of artifacts, and automatically transform the first artifact tree into a first augmented tree using a set of heuristics, wherein the set of heuristics automatically inserts one or more augmentation nodes into the first artifact tree. The at least one electronic processor is also configured to automatically generate a second artifact tree for the hazard for a second version of the software-based system by recursively following the traceability paths defined by the model and automatically transform the second artifact tree for the hazard into a second augmented tree using the set of heuristics, wherein the set of heuristics automatically inserts one or more augmentation nodes into the second artifact tree. The at least one electronic processor is further configured to automatically compare the first augmented tree and the second augmented tree to generate a delta view and automatically generate at least one selected from a group consisting of a safety warning for the second version of the software-based system based on the delta view and an actionable recommendation based on the delta view to maintain safety of the second version of the software-based system.

Yet another embodiment provides a non-transitory computer readable medium including instructions that, when executed by at least one electronic processor, perform a set of functions. The set of functions includes automatically generating a first artifact tree for a hazard for a first version of a software-based system by recursively following traceability paths defined by a model for a plurality of artifacts associated with mitigating the hazard, wherein the traceability paths represent links between the plurality of artifacts, and automatically transforming the first artifact tree into a first augmented tree using a set of heuristics, wherein the set of heuristics automatically inserts one or more augmentation nodes into the first artifact tree. The set of functions also includes automatically generating a second artifact tree for the hazard for a second version of the software-based system by recursively following the traceability paths defined by the model and automatically transforming the second artifact tree for the hazard into a second augmented tree using the set of heuristics, wherein the set of heuristics automatically inserts one or more augmentation nodes into the second artifact tree. The set of functions further includes automatically comparing the first augmented tree and the second augmented tree to generate a delta view and automatically generating at least one selected from a group consisting of a safety warning for the second version of the software-based system based on the delta view and an actionable recommendation based on the delta view to maintain safety of the second version of the software-based system.

DETAILED DESCRIPTION

Figure 1:
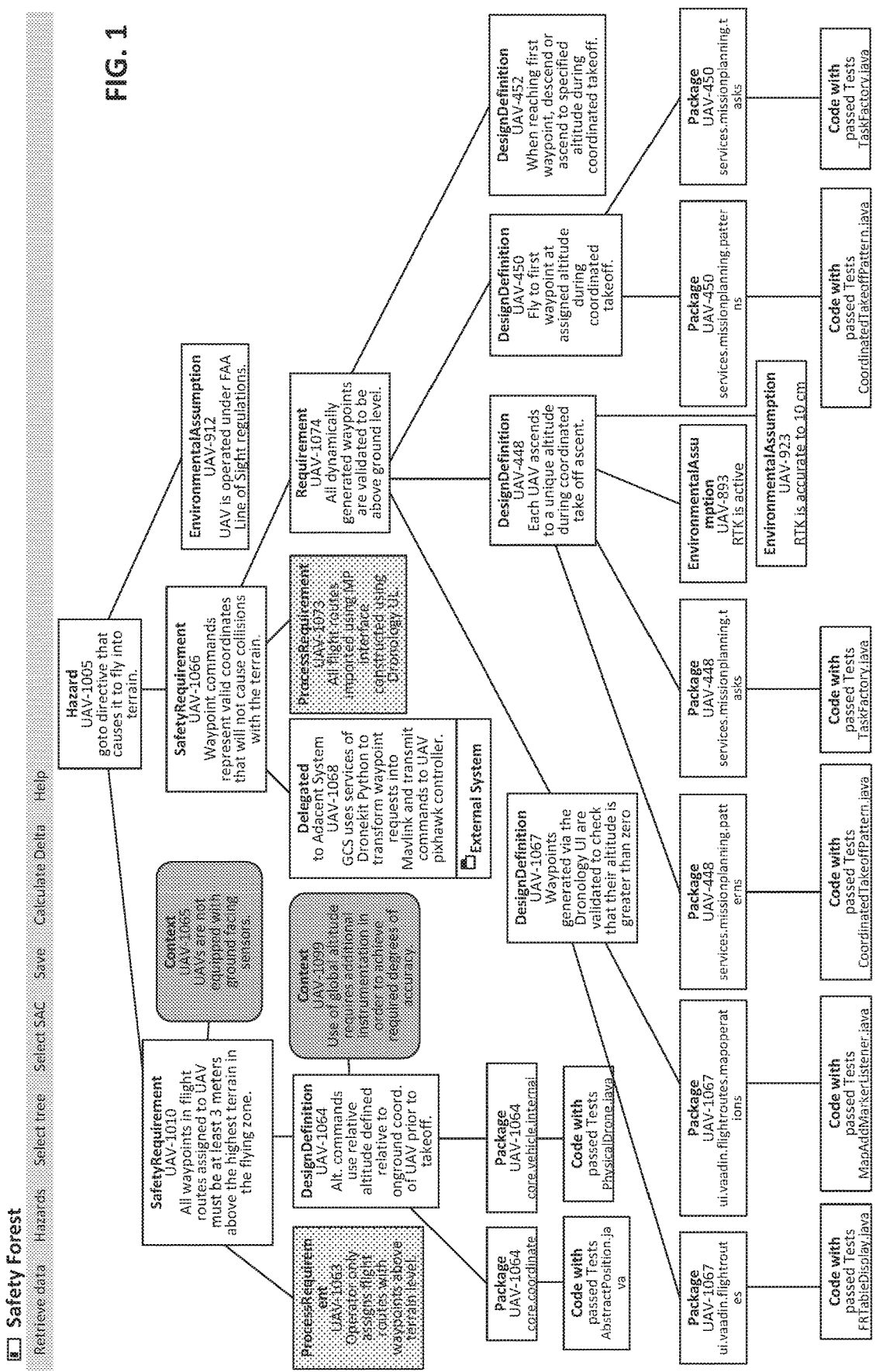
FIG. 1 illustrates examples trees generated as part of a Safety Artifact Forest Analysis (SAFA) according to some embodiments.
Figure 2:
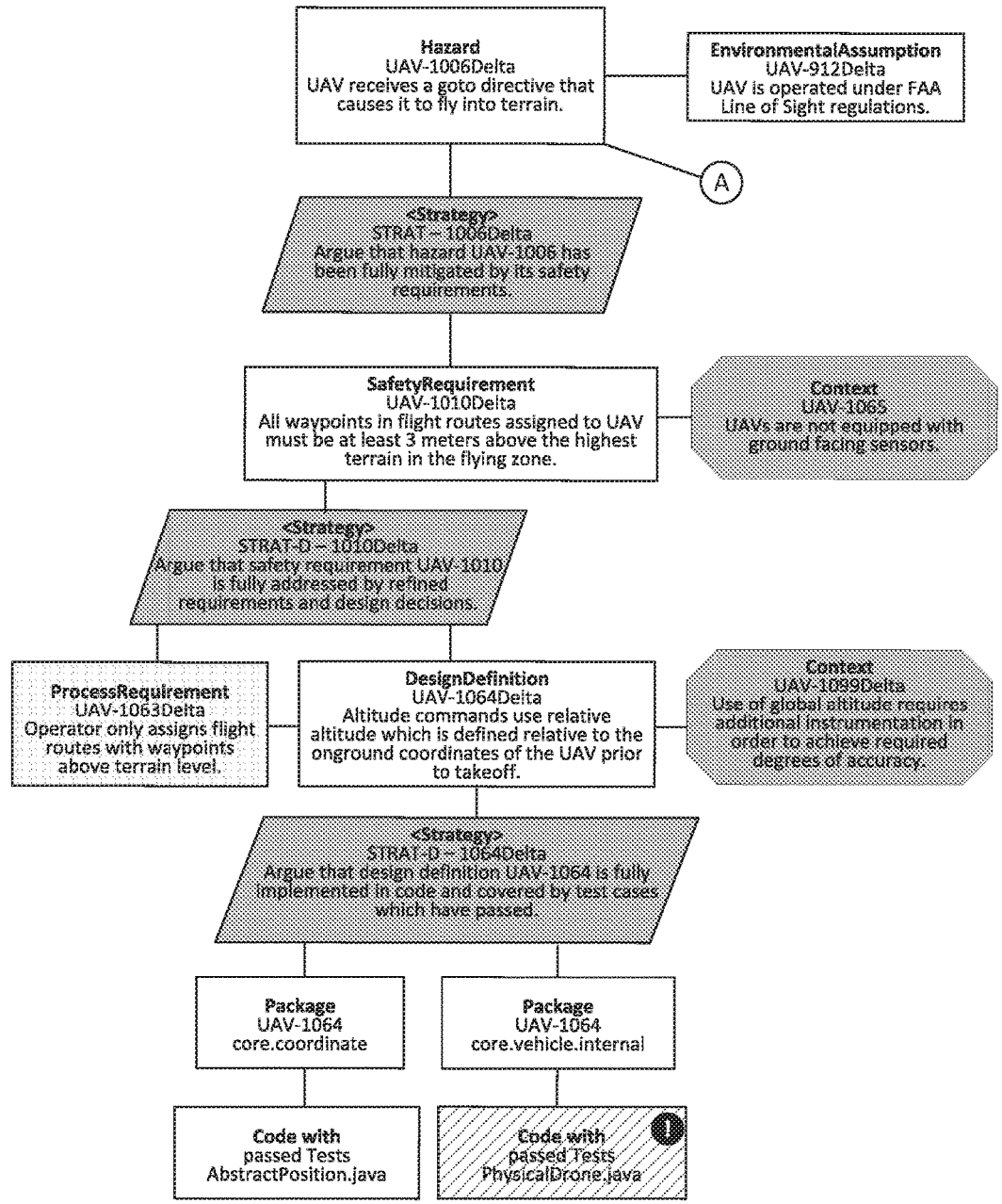
FIG. 2 illustrates examples trees generated as part of a SAFA with a delta tree highlighting changes between two versions according to some embodiments.
Figure 2:
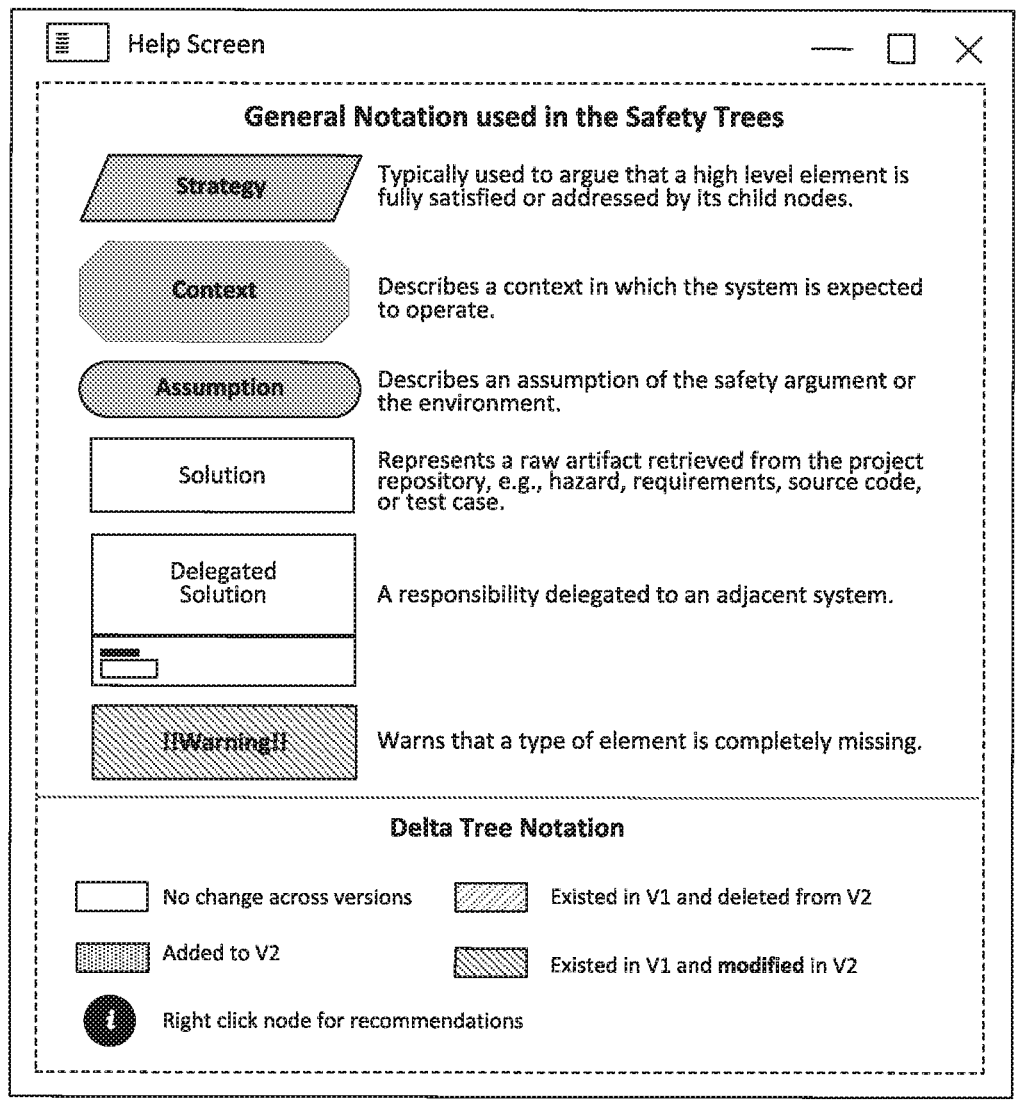
Figure 2:
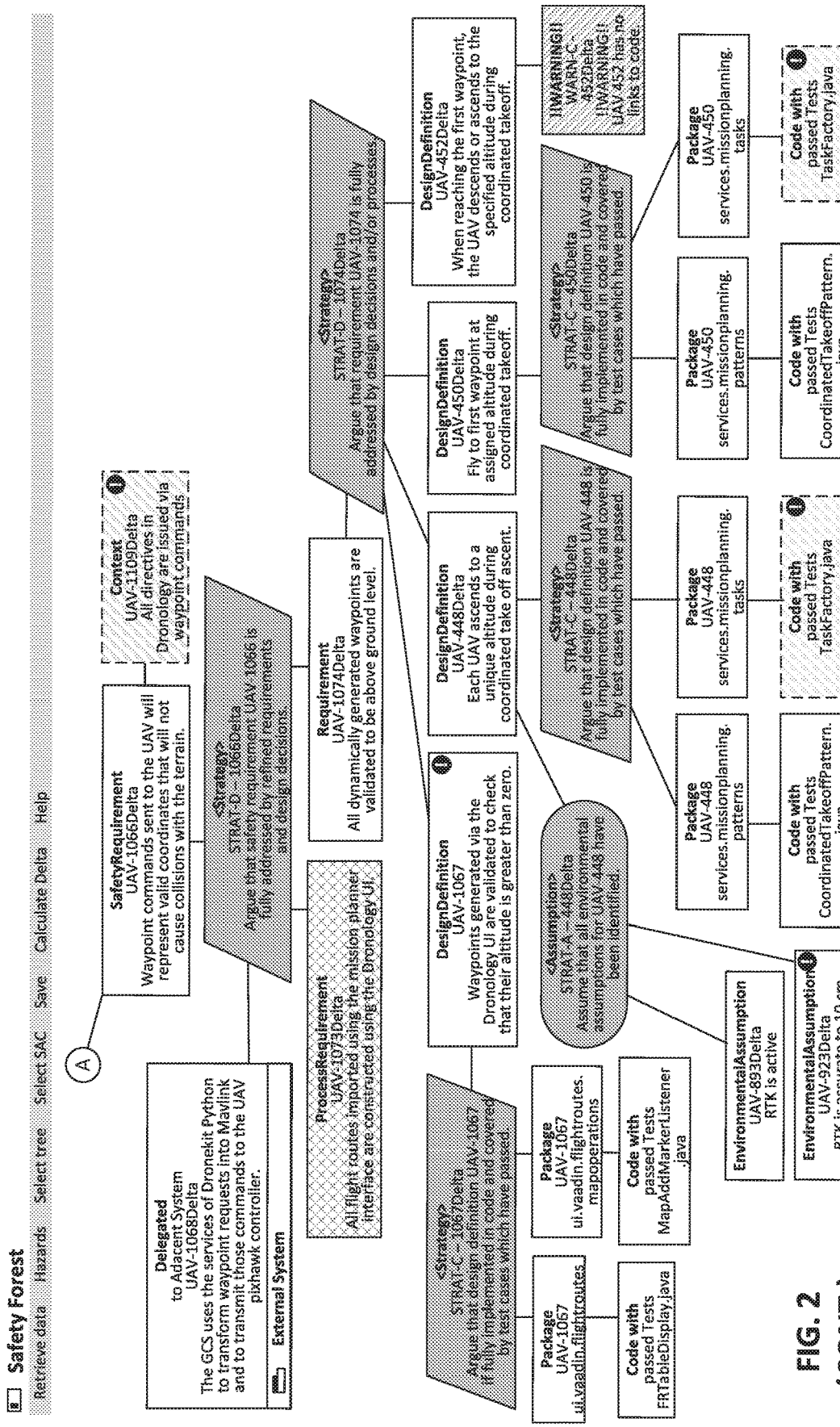

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted above, some software-based systems are associated with requirements (for example, defined using natural language) and developers implement such systems (write code) based on these requirements. Although some tools may exist that support safety cases, these tools merely focus on creating and modeling a safety case, are disconnected from the development environment, and lack support for understanding the impact of changes on the safety case. Therefore, such tools are notoriously hard to maintain and difficult to use to initially structure and construct formal safety cases. Thus, to address these and other technical problems with existing safety case technology, embodiments described herein provide a new way of modeling a safety argument, while providing connections to project artifacts and using software analytics to understand how a change impacts the safety case. These embodiments provide several commercial and practical applications including, for example, providing a tool supporting both traceability and safety analysis for organizations building devices with safety impact (for example, medical devices, signaling systems, robotic controls, and the emerging unmanned aerial vehicle (UAV) market) that may not be developing software using formal methods. In some situations, this tool (or a subset of such a tool) may also be used by organizations developing in non-safety critical domains. For example, the tool may be provided as a product line with add-on features to support diverse development environment. In some embodiments, the tool also includes one or more application programming interfaces (APIs), which may be included in a library of interfaces, for interfacing with other tools or systems, such as other requirements management tools, such as Jira, DOORS, GitHub, Bitbucket, or the like. In many situations, the tool supports agile development to support faster iterations of CPS development. Further details regarding the tool are provided below.

In particular, Safety Assurance Cases (SACs) are increasingly used to guide and evaluate the safety of software-intensive systems. SACs can be used to construct a hierarchically-organized set of claims, arguments, and evidence to provide a structured argument that a system is safe for use. However, as the size of the system evolves and grows in size, a SAC can be difficult to maintain. Accordingly, embodiments described herein provide a novel solution (for example, using design science) for identifying areas of a SAC that are affected by changes to the system. Embodiments described herein generate actionable recommendations for updating an existing SAC for a system, including its underlying artifacts and trace links, to evolve an existing safety case for use in a new version of the system. These embodiments use a Safety Artifact Forest Analysis (SAFA) that leverages traceability to automatically compare software artifacts from a previously-approved or certified version with a new version of the system. The SAFA also identifies critical changes in the system and, in some embodiments, visualize these changes in a delta view of the two versions. In addition, in some embodiments, the SAFA provides actionable recommendations that an analyst or developer can take to evolve the safety case. As described herein, the SAFA was evaluated using a UAV system (Dronology) for monitoring and coordinating the actions of cooperating, small UAV. Results from this evaluation are also included herein and demonstrate that the SAFA helped identify changes that potentially impacted system safety and provided information that could be used to help maintain and evolve a SAC.

I. Introduction

As noted above, safety-critical software systems represent a class of systems whose failure or malfunction could result in casualties or serious financial loss. Building such systems requires rigorous safety analysis and the construction of a systematically argued safety case. For example, a Safety Assurance Case (SAC) organizes goal-oriented or claim-based safety arguments into a tree structure by decomposing a top-level safety goal or claim into several layers of arguments. Additionally, these arguments are supported by evidence, such as test results, formal reviews, or simulations. SACs are therefore a useful and well-established technique for supporting developers, architects, safety analysts, and other project stakeholders as they proactively build, evaluate, and provide evidence for the safety of a system. Currently, many certification and approval bodies for software-intensive, safety-critical domains recommend the use of SACs. For example, the US Food and Drug Administration (FDA) has issued formal guidelines requiring infusion pump manufacturers to submit SACs as part of the safety approval process. Similarly, the Ministry of Defense of the UK requires all defense system contractors to provide SACs for their products and services. SACs are also recommended by standards, such as ISO 26262 for road vehicles, IEC 62425 for railway electronic systems, and IAEA SSG-23 for radioactive waste management systems.

Despite their increasing adoption, the creation and maintenance of SACs is challenging for several reasons. Challenges include a lack of guidance for constructing effective safety arguments, a tendency to suffer from confirmation bias, an over reliance on the regulation culture, and lack of focus on confidence and uncertainty issues. Furthermore, SACs need to co-evolve with the system they represent, requiring analysts to identify the impact of a system change and to recognize when seemingly innocuous changes in the operating environment impact the SAC's validity.

Problems associated with the evolution and maintenance of SACs have not yet been effectively addressed. Accordingly, embodiments described herein provide a Safety Artifact Forest Analysis (SAFA) to directly address this challenge. SAFA is designed to automatically identify the impact of system-wide changes on a previously approved or certified safety case (for example, SAC, Fault Tree, FMECA, or the like) to facilitate evolution and ultimately safe reuse of a SAC's elements within the context of a new version of the system.

The SAFA described herein adopts standard guidelines to create an initial SAC that includes goals, claims, evidence, and solution nodes in which the mitigation of specific hazards are represented as goals to be achieved. Hazards, and hence their associated mitigation goals, are often organized into a hierarchy, in which each leaf hazard is mitigated in the system through a set of artifacts that include safety requirements, design solutions, analytical models, source code, and assumptions, and are validated through diverse tests, reviews, and simulations. These artifacts are connected to each other, and to the leaf hazard, through a set of trace links. This collection of artifacts or a single hazard is referred to herein as an Artifact Tree and the collection of Artifact Trees is referred to herein as an Artifact Forest. SAFA retrieves Artifact Trees from project repositories (for example, Jira, Github, or the like), and automatically augments the Artifact Trees with argumentation structures (for example, adopted from the Goal Structuring Notation (GSN)), that are designed to aid developers and analysts in reasoning about system safety. This set of augmented Artifact Trees are referred to herein as Safety Trees. The entire set of Safety Trees forms a system-wide Safety Forest, composed of the top-level sets of goals, claims, and strategies, connected to a lower layer of Safety Trees, with the connection points being the leaf hazards and their mitigation goals.

When a new version of the system is developed, the previous version of the Safety Forest is retrieved and compared against the new Safety Forest. The SAFA generates warnings within each Safety Tree to highlight changes that potentially undermine system safety. Further, in some embodiments, the SAFA generates actionable recommendations to aid a safety analyst through the process of making changes that are needed to achieve and demonstrate safety. Recommendations may include advice, such as for example, to increase the diversity of evidence that a hazard has been mitigated through integrating test case results or simulations into the safety case, to investigate the impact of changed contexts or environmental assumptions on lower level nodes, or to assess or create trace links.

As described below, the SAFA described herein generally includes three steps. In the first step, one or more Safety Trees are automatically generated for a new version of the system and safety-related deficiencies are highlighted. In the second step, the newly-generated Safety Trees (for a new version of the system) are compared with the Safety Trees of a previous version of system (a previously approved or certified version) to detect and visualize changes that could impact the validity of the SAC (previously generated for the previous version). In the third step, zero or more warnings and recommendations are generated to aid a user in evaluating and updating evidence of hazard mitigations in the current Safety Trees. Accordingly, the embodiments described herein reduce the cost and effort of evolving and reusing safety case elements for a new version of the system, while maintaining or even increasing levels of safety.

The description below is structured into three sections: Section I (providing an introduction), Section II (describing the SAFA approach for generating a Safety Forest including the rules for injecting SAC nodes into individual Safety Trees), Section III (describing comparing two Safety Forests, identifying nodes that are impacted by changes, and generating actionable recommendations, Section IV (introducing a SAFA toolkit), Section V (describing SAFA's application to a UAV system), Section VI (presenting results of the application to the UAV system), and Section VII (providing a conclusion).

II. Overview of the Process

In some embodiments, design science approaches (such as Wieringa's design science approach or modifications thereof) can be used to design, develop, and refine the SAFA solution as described herein. Such design science approaches can use five steps of information gathering and analysis, design, initial validation and refinement, user evaluation, and feedback based refinement. For example, During the information gathering and analysis step, literature related to the use of Safety Assurance Cases (SACs) and traceability in safety-critical projects including case studies and examples of completed SACs can be reviewed to identify ways in which SACs are impacted by changes made to a system, and to identify remediation steps that could update the SAC to reflect the current state of the system.

During the design step, observations gathered during the information gathering and analysis step can be used to iteratively design algorithms for generating and visualizing Safety Trees. In the initial validation and refinement phase, features in the SAFA can be developed and used to generate Safety Trees. The generated Safety Trees can then be used to build a SAC for each leaf hazard to evaluate the safety of a system under development (using observations from this experience to improve the design of SAFA). After each increment, the effectiveness of the existing features can be evaluated, missing features and improvements can be identified, and the process can be repeated.

Figure 3:
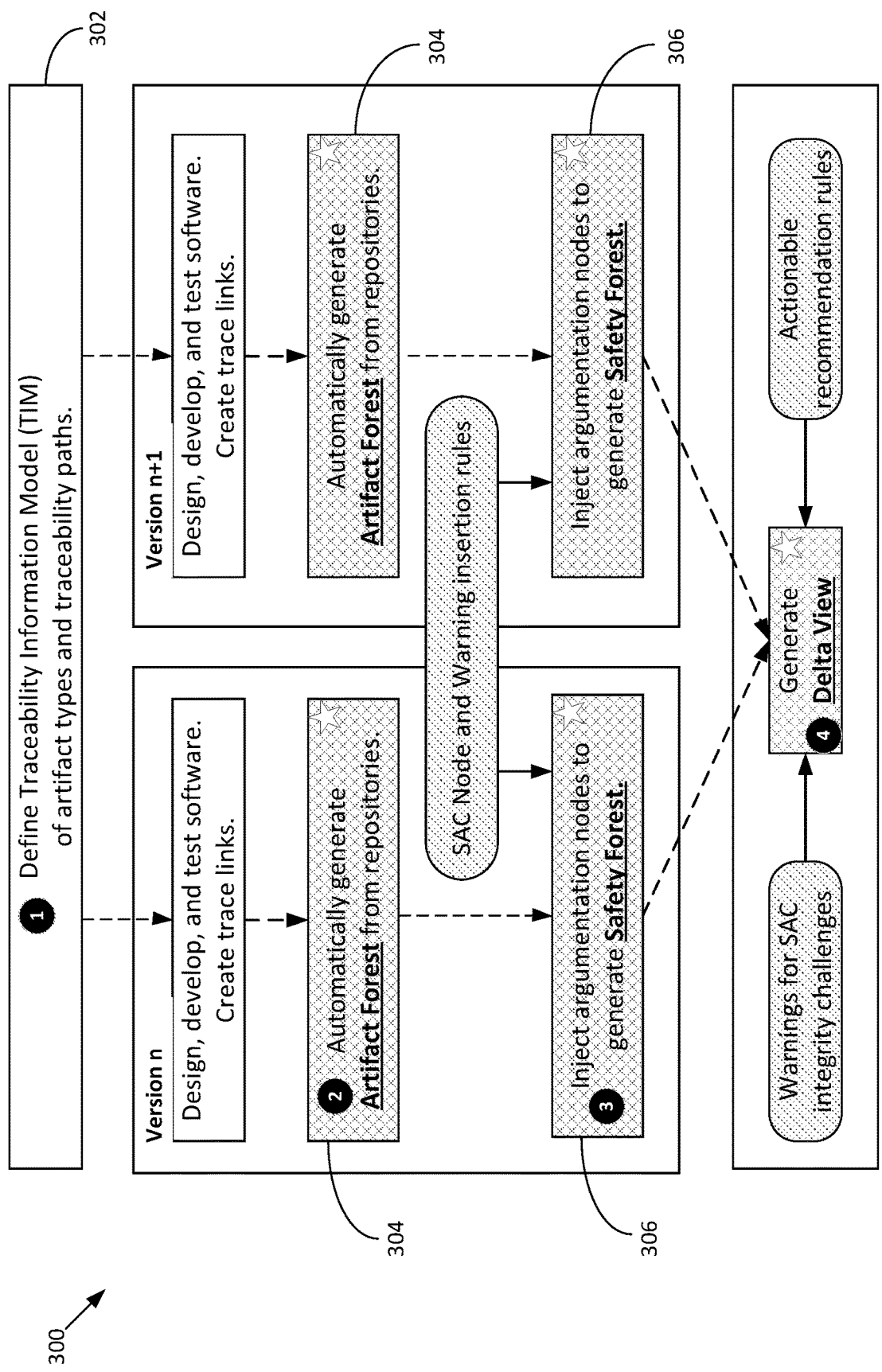
FIG. 3 illustrates a SAFA process for generating safety trees to support change impact analysis and to guide safety analysts through the process of evolving and reusing existing safety assurance cases according to some embodiments (automated elements are marked with a star).

In the remainder of this section, SAFA is described in more detail, using an example drawn from the Isolette case study, a safety-critical infant incubator used in hospitals. The description, as part of providing a useful and clear example, focuses on the Isolette system's mitigation of the hazard "undetected thermostat failure." In some embodiments, the SAFA uses the Goal Structuring Notation. However, other SAC notations could be used in other embodiments. The he overall process 300 is illustrated (in summary form) in FIG. 3 for a version n of a system and a version n+1 of the system. Elements marked with a star in FIG. 3 represent automated elements of the process in some embodiments.

A. Define a Traceability Information Model

In some embodiments, SAFA uses the presence of an underlying Traceability Information Model (TIM) for a system, which defines artifacts and traceability paths for the artifacts. Accordingly, as illustrated in FIG. 3, an initial step of the SAFA process can include defining the TIM of artifact types and traceability paths for the system (block 302). Some embodiments use a TIM as illustrated in Table I (below), which includes elements that are commonly used across many safety critical development processes. The artifacts are transformed into a hierarchical structure (Hazards→Requirements→Design Definitions→Code) with supporting evidence (for example, context, environmental assumptions, acceptance tests, and simulations). As used in Table I, "Ref" means "Refines," "An" means "Analyzes," "Mit" means "Mitigates," "Rl" means "Realizes," "Imp" means "Implements," "Test" means "Tests," "Sim" means "Simulates," "As" means "Assumes," and "Ctx" means "Contextualizes." It should be understood that the above hierarchical structure represents one example of a hierarchical structure and that the actual hierarchy may vary across projects.

TABLE I

| Artifact Type | H | SA | SR | R | DD | CX | EA |
|---|---|---|---|---|---|---|---|
| Hazard (H) | | Ref | | | | As | |
| Safety Analysis (SA) | An | | | | | | As |
| Safety Req. (SR) | Mit | | Ref | | | | As |
| Requirement (R) | | | Ref | Ref | | | As |
| Design Def. (DD) | | | | R1 | Ref | | As |
| Src. Code & Tests (SC) | | | | | Imp | | As |
| Context (CX) | Ctx | Ctx | Ctx | Ctx | | | |
| Env. Assumption (EA) | | | | | | | |
| Acceptance Test (AT) | | | | Test | | | |
| Simulation (SIM) | | | | Sim | | | |

B. Retrieving an Artifact Tree

Figure 4:
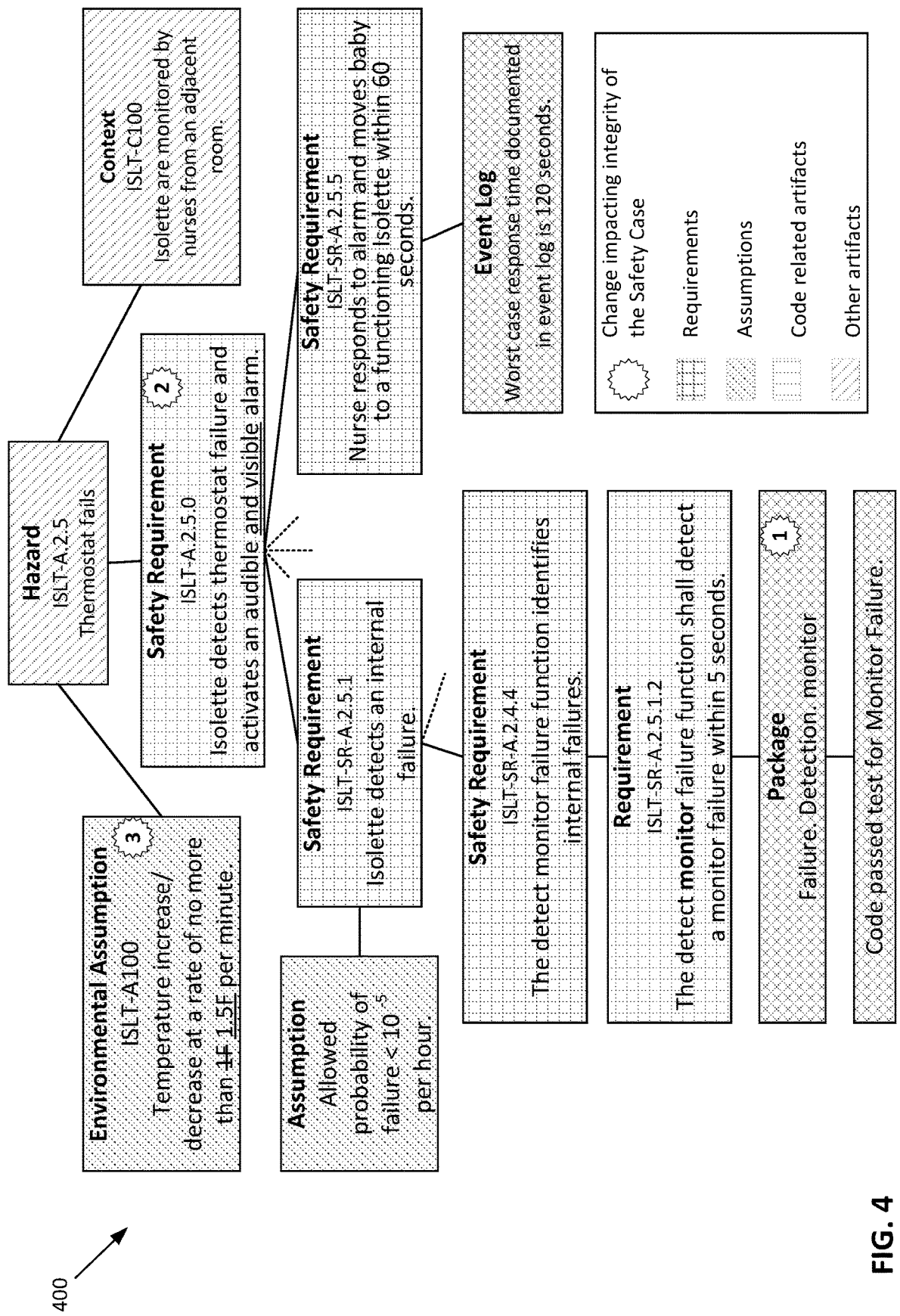
FIG. 4 illustrates a subset of software artifacts that mitigate a hazard of "Undetected Thermostat Failure" according to some embodiments.

As illustrated in FIG. 3, after the TIM is defined, an Artifact Tree is generated by recursively following trace links defined in the TIM from the hazard all the way down to code and unit tests (block 304). Contextual information, such as environmental assumptions, safety analysis artifacts, acceptance tests, and simulations, is also retrieved as evidence that the hazard has been mitigated. The example tree 400 illustrated in FIG. 4 represents some of the software artifacts associated with the Isolette hazard of "undetected thermostat failure."

The generation of the Artifact Tree depends upon the existence of semantically-typed trace links defined in the TIM. Such trace links can be created manually, generated using an automated approach, or mined from commit messages. Some requirements management tools, such as Jira and DOORS, provide support for semantically typing links between different types of artifacts, and facilitate the creation of links as an integral part of the analysis and specification process. Furthermore, commits to version control systems, such as Github, can be tagged with requirement IDs to create links to source code. As these trace links are required in most safety-critical domains, using these trace links as part of the SAFA adds minimal overhead to the traceability effort.

C. Transformation to a Safety Tree

Figure 5:
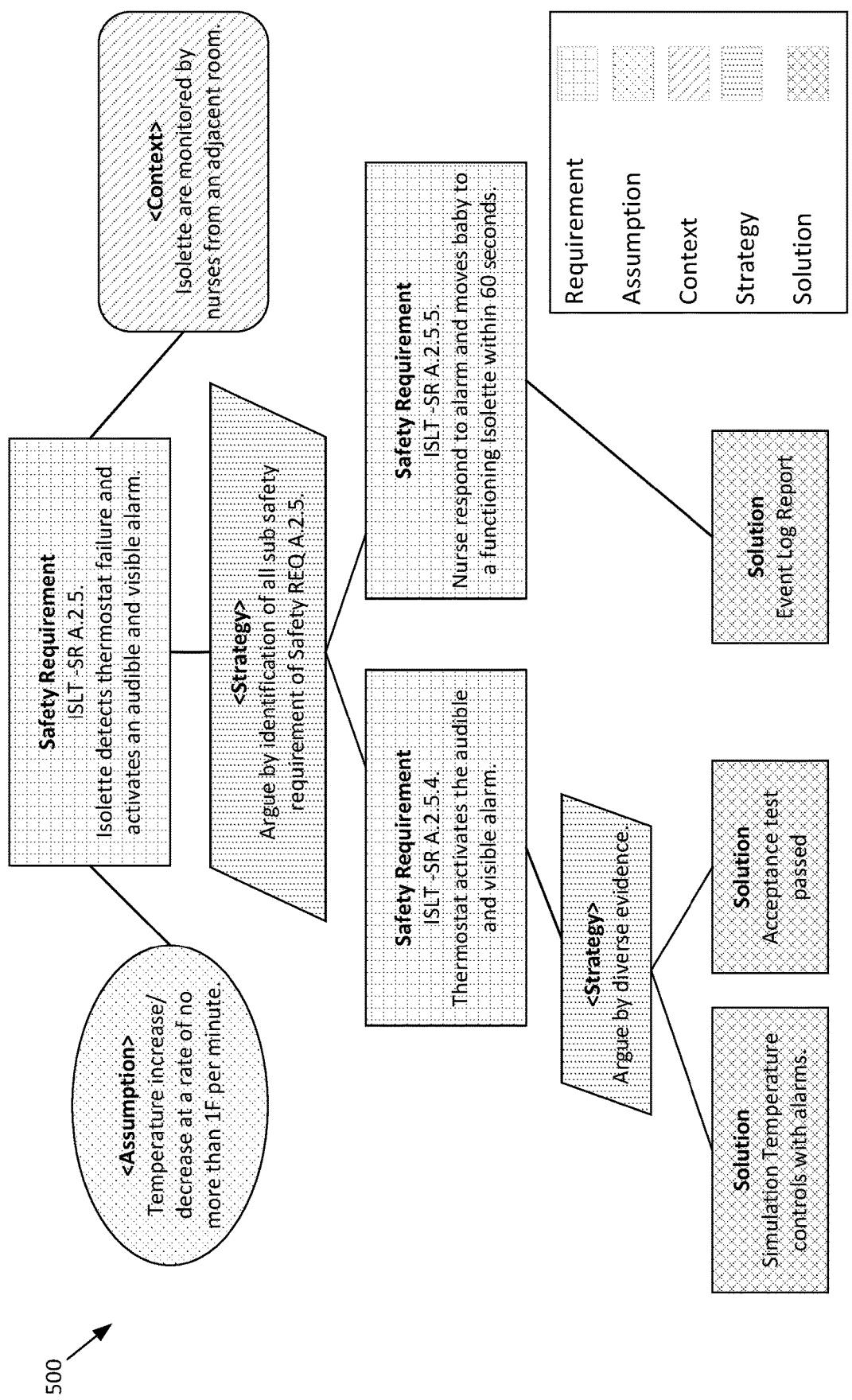
FIG. 5 illustrates a section of a safety tree showing claims, strategy, and solution nodes according to some embodiments.

SAFA provides a set of heuristics for transforming an Artifact Tree into a Safety Tree (block 306). The heuristics define how claims, strategies, assumption, and solution nodes should be inserted into the tree between existing artifacts. An example partial Safety Tree 500 is illustrated in FIG. 5. The complete Safety Tree could be inserted as evidence into a safety case (e.g., a top level SAC, a Fault Tree, a FMECA, or the like) to show that a hazard has been mitigated or individual nodes, individual subtrees, or both could be reused as elements of a manually constructed SAC.

The heuristics include rules for inserting specific types of SAC nodes (for example, strategies and claims) and for adding warnings when expected links, artifacts, or both are missing. All inserted nodes are designed to help an analyst reason about the extent to which the hazard has been mitigated. Insertion rules according to one embodiment are depicted in Table II (below).

TABLE II

| Id | Source | Target | Condition | Argument or Claim |
|---|---|---|---|---|
| | | Strategy Nodes | | |
| 1 | Hazard | Safety Anal. | Safety Analysis exists | Argue that all critical faults for hazard ID have been identified |
| 2 | Hazard | Safety Req. | Safety Requirements exist | Argue that hazard ID is fully mitigated by its safety requirements |
| 3 | Safety Req. | Environmental Assumption | At least one environmental assumption is specified in the subtree | Assume that all environmental assumptions are identified for Safety Requirement ID. |
| 4 | Hazard | Evidence | More than one independent evidence (FTA, Simulation, Test) linked | Argument by diverse evidence |
| 5 | Safety Req. | Design Definition | At least one design definition exists | Argument by claiming design definition meets safety requirement |
| 6 | Design Def. | Code with passed tests | At least one package is linked | Argument by claiming to have followed specific guideline in design definition (Argument by correct implementation of design) |
| 7 | Environmental Assumption | Code with passed tests | At least one environmental assumption linked directly to code | Argument by operational assumptions satisfied ("test like you fly") |
| 8 | Safety Req. | Hazard | At least on Hazard exists | Argument by claiming addressed all identified plausible hazards |
| | | Assumption Node | | |
| 9 | Prob. of hazard | Assumption | A FMEA assumption node exists | Claim that FMEA supports assumption of hazard's likelihood |
| | | Context Nodes | | |
| 10 | Safety Req. | Context | System level hazard analysis context node exist | Claim that system level hazard analysis is a context node for top safety requirement |
| 11 | Safety Req. or Hazard | Context | A context node exists | Claim that defining and explaining ambiguous term in statement such as "correct," "low," "sufficient," "negligible" is a context node for Safety Req or Hazard |

TABLE II-continued

| Id | Source | Target | Condition | Argument or Claim |
|----|--------|--------|-----------|-------------------|
| | | | Solution Node | |
| 12 | Prob. of hazard | FTA | FTA gives probability | Claim that FTA evidence is a solution for probability of hazard |

D. Engaging the User in Safety Tree Completion

In some embodiments, a user can perform various tasks on a Safety Tree. For example, a user can respond to warnings and recommendations that highlight problems, such as warnings that identify missing design definitions and recommendations that recommend inspecting various artifacts, rerunning an out of date acceptance test, or evaluating a set of candidate trace links. A user (analyst) can also critically evaluate claims or strategy nodes that the SAFA injects into a Safety Tree. For example, given a claim that a hazard mitigation has been sufficiently decomposed into safety requirements, an analyst can evaluate the claim to determine if the claim is correct. If a claim is found to be incorrect, then additional work is needed to remediate the problem. Also, safety arguments may need sufficient contextual information to enable future maintainers to understand the claims and to modify the SAC. In the context of SAFA this means that the analyst should carefully evaluate contextual information in the Safety Tree and incrementally refine the contextual information by adding additional arguments and contextual information so that the rationale for each claim is sufficiently clear.

III. Safety Tree Comparison

In addition to helping a user assess the safety of a single version of a system, SAFA also supports the reuse of the safety analysis in subsequent releases of the system (software). For example, various change scenarios can impact system safety and can trigger the need to review and potentially update the SAC. Examples include changes in regulatory requirements, system design, environmental assumptions, operational experience, and operator behavior, which can cause the system to be deployed in ways that differ from the original intent.

A. Types of Change Impact

In some embodiments, changes to a SAC can challenge the integrity of the SAC in one or more ways. For example, a SAC can be changed by making changes to (1) solution nodes (low level nodes contributing to the achievement of higher level goals), (2) goals, which are direct or indirect ancestors of a set of solution nodes, and (3) contexts, which provide contextual information for individual nodes or entire subtrees.

Each of these types of changes are illustrated using examples drawn from the Isolette system (labeled as 1-3 in FIG. 4). The first example introduces a change at the solution level within the "failure.detection.monitor" package. In this example, source code has been modified, which triggers the need to evaluate whether associated higher level safety goals are still achieved. The second example reflects a high level change in which the safety requirement ISLT-A.2.5.0 is modified to add an additional hazard warning in the form of a visible light. This change has a trickle-down effect to all descendants including requirements and implementation. As a result, in this example, the entire subtree needs to be re-assessed. The third example illustrates a change to an environmental assumption to reflect new claims by the manufacturer of the heating units (temperatures can now rise at a rate of 1.5° F./hr). This high-level contextual change potentially impacts the entire SAC requiring all safety requirements and their subtrees to be re-evaluated.

For each of these examples, the SAFA recognizes the change scenarios and generates appropriate recommendations. For example, in the case of a context change, SAFA may provide a recommendation of "The [CONTEXTUALIZED NODE] has been [MODIFIED|REMOVED] potentially invalidating the entire subtree. Inspect the subtree to determine if any elements depended upon the previous context."

B. Detecting Changes Between Two Safety Trees

To detect changes between two versions, V1 and V2 (or, generically, version n and n+1), of a system, the pair of Artifact Trees associated with each leaf hazard are compared, checking for additions, deletions, and modifications of all artifacts defined in the TIM. After any changes are identified, a new delta view is generated representing the superset of all artifacts found in a hazard's Safety Tree for both versions. Differences between the two versions can be annotated to clearly depict which artifacts, trace links, or both were added, deleted, and modified in the new version. It should be understood that if there are no changes then no nodes would be marked in the visualization. Accordingly, although it may only be an extreme case where no changes are made throughout the entire system, in some embodiments, only one part of a system may have changed and, therefore, all other (non-impacted) tree will have no safety warnings.

In some embodiments, to gain a deeper understanding of any code modifications and their potential impact upon the safe mitigation of the hazards, the SAFA may reverse engineer source code refactoring (for example, using Trace Link Evolution (TLE)) to identify previously unlinked code that could impact the safety case and recommend potential links between design definitions and code. For example, TLE is designed to detect a set of change scenarios based primarily on Fowler's dictionary of source code refactorings. It employs a combination of information retrieval techniques (namely the Vector Space Model) and a refactoring detection tool to detect change scenarios organized into high-level change categories, such as, for example, 24 change scenarios organized into six high-level change categories of add class, delete class, add method, delete method, modify method, and basic. Accordingly, TLE offers explanations for why a specific class or set of classes has changed (for example, due to a specific refactoring), enabling an analyst to determine whether the change is likely to impact safety or not. Also, when applied to design definitions (a lowest level of specification) and source code classes, TLE identifies and recommends potentially missing trace links, thereby introducing the possibility of adding new links, and, therefore, new artifacts to a tree.

C. Generating the Delta View

In some embodiments, a SAC change process includes five steps: (1) recognizing challenges to the validity of the safety case, (2) expressing those challenges within the context of the SAC, (3) determining the impact of the challenge on the SAC, (4) determining actions needed to recover from the challenge, and (5) actual recovery. The SAFA visualization described herein provides support for at least steps 1 to 3. Moreover, to address steps 4-5, embodiments described herein augment the delta view with recommendations designed to help the analyst address potential safety violations that were introduced through the changes.

A preliminary set of recommendations is incorporated into the SAFA based on types of known change scenarios and also observations from developing a system, such as the UAV system described herein, of how change events impact SACs. In some embodiments, the SAF also includes an API for customizing the set of recommendations for a specific project to accommodate factors such as domain, safety integrity level (SIL), and project-specific artifacts (for example, hazard analysis techniques, simulations, requirements architectures), supported traceability paths, adopted repositories and tools, development processes, and combinations thereof.

An example initial set of recommendations is depicted in Table III (below). Each recommendation includes a brief description, a primary condition under which it is triggered (a rule adding actionable advice to a delta tree), an associated warning, and one or more secondary conditions which trigger specific recommendations. When the integrity of a safety case is challenged, responsible parties should decide on an appropriate response ranging from a complete revision of the safety case to doing nothing at all. For example, if a new feature has been added and a new hazard identified and documented, then the recommendation could be to perform an extensive safety analysis starting with hazard analysis for the feature by checking "that hazard analysis is complete for [FEATURE NAME]" and "if necessary create new Safety Trees associated with new hazards."

TABLE III

| Change | Warning | Secondary Condition | Recommendation |
|---|---|---|---|
| W1: Feature is added or deleted | A new/deleted feature [FEATURE] potentially impacts the following Safety Trees: [LIST OF SAFETY TREES]. | FMEA or FTA exists for feature. | Check that hazard analysis is complete for [FEATURE NAME]. If necessary create new Safety Trees associated with new hazards. |
| | | At least one existing feature exists. | Perform a feature interaction analysis for this feature with other existing features. |
| | | At least one Safety Tree added or removed for the feature. | Perform a complete check of each Safety Tree associated with hazards for [FEATURE NAME] including all strategies, claims, and contexts. |
| W2: Requirement is added, deleted or modified | Requirement [REQUIREMENT ID] has been [Add., Del., Mod.]. | Requirement has been added or modified. | Check the claim that requirement [REQUIREMENT ID] mitigates hazard [SAFETY TREE HAZARD ROOT] and is fully realized through the design, implemented in the code, with diverse and sufficient evidence provided. |
| | | Requirement has been deleted or modified. | Check the claim that [REQUIREMENT PARENT] remains satisfied even though [REQUIREMENT ID] has been [DELETED-MODIFIED]. |
| W3: Source code is changed | Source code in [PACKAGE] has been modified by [MODS]. | All | Check that all code is covered by passed unit tests. |
| | | SAFA recommends trace link maintenance. | Check the [LIST OF RECOMMENDED TLE ACTIONS] to confirm additions and deletions of trace links. |
| W4: Context and/or assumptions have changed | Context | Assumption associated with [CONTEXT NODE] has changed. | Environmental assumption has changed. | Check all goals, claims, strategies, and solutions that are influenced by [ASSUMPTION]. |
| | | Probability has changed. | Check that all goals, claims, strategies, and solutions that are influenced by [PROBABILITY] are supported within the new probability context. |
| W5: Evidence has been modified or deleted | Evidence has been modified or removed. | Solution has been deleted or modified. | Solution that [goal] has been satisfied is challenged by elimination or change of [EVIDENCE TYPE]. Check that [GOAL] is sufficiently satisfied. |
| | | Diversity of evidence has been reduced. | Diversity of evidence that [GOAL] has been satisfied is reduced by elimination of [EVIDENCE TYPE]. Check that [GOAL] is sufficiently satisfied. |

-continued

TABLE III

| Change | Warning | Secondary Condition | Recommendation |
|---|---|---|---|
| | | Context node using this evidence has changed. | Check all goals, claims, strategies, and solutions that are influenced by [CONTEXT]. |

IV. Tool Support with the Safa Toolkit

In some embodiments, the SAFA provides a toolkit designed to support the entire process of retrieving artifacts and links from project repositories, and generating and visualizing Artifact Trees, Safety Trees, and delta views. In some embodiments, hazard descriptions, requirements, design definitions, environmental assumptions, acceptance test descriptions, and context information are stored in one software project management system (for example, Jira), while code, unit tests, and acceptance test results logs are stored in a separate software management system (for example, Github). In other embodiments, however, more or fewer software project management systems or repositories may interface with the SAFA. For example, in some embodiments, the SAFA is implemented (for example, in Java) with interfaces to Jira and GitHub repositories; however, in other embodiments, the SAFA could also have interfaces to other systems or repositories, such as DOORS or Bitbucket. A TIM defining the trace links (see, for example, Table I (above)), can also be implemented via a software project management system, such as using Jira's semantically typed trace link features. Trace links to source code can also be are created by tagging GitHub commits with the respective Jira issue ID, while other trace links can be created and maintained inside Jira.

Figure 6:
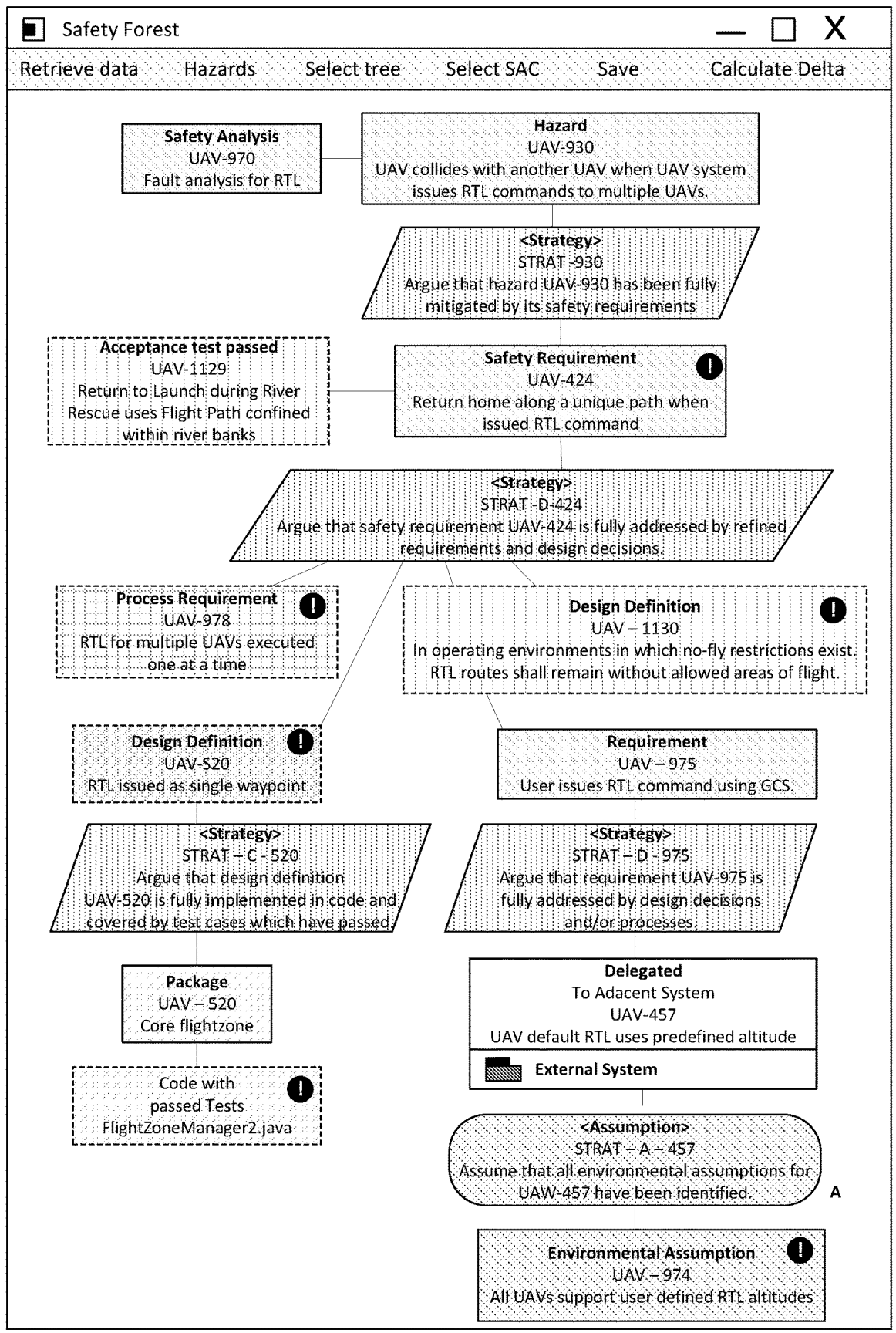
FIG. 6 illustrates a partial delta view generated by the SAFA for a leaf hazard according to some embodiments.

In some embodiments where Jira is used, an artifact parser retrieves a hierarchy of hazards from Jira, identifies leaf hazards, and then retrieves all artifacts that are directly or indirectly linked to the leaf hazards in ways that comply with the TIM. This means that links are traversed in directions designated by the TIM, preventing the problem of a cyclic graph of artifacts. The SAFA can display the system-level hazard hierarchy, and then generate an Artifact Tree, a Safety Tree, and a delta view for each leaf hazard. To generate a delta view, the user specifies one version of the system as the baseline, one version as the current version, and requests all trees and views to be generated accordingly. In some embodiments, the SAFA uses graph visualization software, such as Graphviz, to dynamically lay out nodes into a tree structure. The SAFA can be configured to shade, outline, color, or otherwise mark nodes differently depending on a state of the node. For example, in some embodiments, the SAFA shades or colors added nodes green, deleted nodes red, and modified nodes blue. Similarly, warning nodes can be shaded or colored orange and advice or a recommendation can be marked by an icon or the like. For example, FIG. 6 illustrates an example of a delta view 600 for a leaf hazard of the UAV system rendered using the SAFA. The delta view 600 illustrated in FIG. 6 represents a partial delta view generated by the SAFA for the leaf hazard "UAV Collides with Another UAV when UAV system issues a RTL (return to launch command) to multiple UAVs." Nodes marked with an exclamation point (!) are associated with advice or a recommendation. Such advice or recommendation may be automatically generated by analyzing the semantics and structure of nodes in one or more trees, using heuristics, machine learning, or deep-learning algorithms to identify problems and generate recommendations, or a combination thereof. As illustrated in FIG. 6, an acceptance test and design definition have been added (see nodes 602 and 604), another design definition and source code class have been modified (see nodes 606 and 608), one process requirement has been removed (see node 610), and six recommendations have been made (see nodes 604, 606, 608, 610, 612, and 614).

V. Safa Evaluation on the UAV System

A. The Dronology Project

As noted above, an embodiment of the SAFA described herein was used to support the safety analysis of two versions of a UAV system (Dronology). The Dronology system provides features for managing, monitoring, coordinating, and controlling small unmanned aerial vehicles (UAVs). This UAV system includes a flight manager responsible for scheduling flight routes for multiple UAVs, basic collision avoidance, a flight activity logger, several UIs for planning routes, monitoring UAVs in real time, registering UAVs, and a Ground Control Station (GCS) middleware, as well as a concrete implementation for communicating and controlling both simulated and physical UAVs. The Dronology GCS interfaces with ArduPilot-based UAVs and has been flight-tested with five different physical UAV models. It also interfaces with the ArduPilot Software-in-the-loop (SITL) simulator to enable high-fidelity simulations. The Dronology system exhibits non-trivial safety concerns due to its application to real-world scenarios including search-and-rescue and medical supply delivery.

In one embodiment, Dronology's top level hazard tree includes 23 hazards with 15 leaf hazards. For experiments described herein, two versions (V1 and V2) of the Dronology was used and compered, wherein V1 was completed in the Spring of 2018 immediately prior to a public search-and-rescue demo and V2 introduced several new features. V1 included 49,400 LOC, 418 Java classes, and a total of 146 requirements, and 224 design definitions. V2 involved over 500 hours of design and coding by a professional developer on a collision avoidance branch (branched August 2017 and merged June 2018), 1,500 hours of development by a team of 6 graduate and undergraduate students, and over 500 hours by senior members with prior industrial experience on a mission planning branch (branched April 2018 and merged July 2018). V2 included 73,591 LOC, 646 Java classes, 185 requirements, and 283 design definitions. Both versions also included hazard analyses, acceptance and unit tests, simulations, environmental assumptions, and other contextual information.

B. Change Scenarios in Dronology

Change scenarios for the Dronology system includes a context change, a requirement change, and an evidence change. It should be understood that these represent examples of types of changes. For example, in other embodiments, a new hazard could be discovered, code could be refactored to fix a performance issue, or the like. Furthermore, changes can be initiated at multiple points.

As an example of a context change, the Dronology system is subject to government regulations that provide strict guidelines for flights in various airspaces. For example, when flying in uncontrolled airspace, UAVs may fly up to 400 feet above ground level. However, a new use of the system in an urban area, with close proximity to an airport, may require UAVs to fly in a restricted airspace and to remain below 100 feet. Thus, this represents a change in a high level context node that previously stated that the airspace was uncontrolled, thus requiring all goals, strategies, and claims in lower levels of the SAC to be checked and modified. As a result, a new safety requirement to prohibit UAVs from flying above the maximum altitude was introduced, which in turn introduced a series of process requirements and software-related design decisions to prevent the hazard from occurring. SAFA visually depicts such changes in context in a delta view and also adds a warning (W4, as specified in Table III (above)) associated with a changed assumption.

As an example of a requirement changes, safety requirement associated with a "midair collision" hazard stated that "When two UAV's violate the MINIMUM SEPARATION DISTANCE they will both stop and hover in place." However, field tests showed that physical UAVs were unable to consistently stop in time unless the separation distance was unrealistically large. Thus, a new requirement was introduced in V2 requiring each UAV to progressively decrease its speed as it approached another UAV. For this type of change, the SAFA adds warning (W2).

As an example of an evidence change, in V1 an assumption was made based on prior operational experience that a particular simulator (for example, the Iris 3DR simulator) was sufficiently accurate for testing flight plans prior to their execution. However, during development of V2, collision avoidance directives were sent as velocity vectors instead of as waypoints and it was discovered that the previously-used simulator did not correctly simulate this behavior. Accordingly, in this situation, simulations are removed as a form of evidence that the safety requirements were met and, as a result, SAFA adds a warning (W5) associated with changed evidence causing the lack of evidence to be addressed by adding more diverse acceptance tests for use with the physical UAVs.

C. Observations from SAFA's Design Science Process

To handle inconsistencies between artifacts and missing trace links (which may cause errors of omission in a Safety Tree), the SAFA was configured to create direct hyperlinks from each node to its associated entry (for example, in Jira) so that links could be added and artifact text modified interactively.

To prevent automatically inserted claims and strategies from encouraging a false sense of security that an issue was fully addressed and that the tool should mark each claim as non-validated until it is actively checked and signed off by the analyst, the initial state of each claim and strategy node can be set to non-validated, which requires analyst to check and validate the claim or node. Similarly, any nodes potentially impacted by a new change can be reset to non-validated so that the safety analyst is required to re-validate.

The actionable recommendations added to a delta view provide an explicit explanation for why a change might impact system safety and also provide advice on one or more actions to take. This helps many users, especially those with little safety experience, to better understand and use the advice and recommendations.

Using hyperlinks to a software project management system, such as Jira, allows the SAFA to incrementally add context and rationales to each Safety Tree to better support future maintenance and reuse through the delta views and prevents initially generated trees from containing sparse contextual information that may not be apparent in the project management system but may be apparent once trees are visualized.

D. Evaluation of SAFA's Support for Change Scenarios

To understand the types of changes that impacted Dronology hazards, two researchers who had been part of the Dronology development process and had deep understanding of its safety issues, identified changes that potentially impacted safety for each of the 13 hazards. These were categorized as changes to requirements, design, process, environmental assumptions, context, tests, and source code, and formed the "answer set" for the first part of the study. All of these types of safety artifacts experienced changes during Dronology development of V2 that potentially threatened existing hazard mitigations. Of the 13 identified hazards, changes in V2 impacted the mitigations for eight of the hazards. These eight hazards and the associated changes are shown in Table IV (below). For each changed artifact, the results from the SAFA were checked to see whether the process had correctly detected and visualized the change and whether an appropriate warning and recommendation had been issued by the SAFA. It should be understood that the remaining five hazards (to represent the 13 hazards identified) are not shown in Table IV as they were not impacted. As used in Table IV, "SR" means a change in a safety requirement, "PR" means a change in process," "DD" means a change in a design definition, "AJ" means a change in an adjacent system, "CX" means a change in context, "AS" means a change in an assumption, "TS" means a change in a test, "SC" means in a change in code, "Vis" means a change visualized in a delta view, and "REC" means a recommendation was provided. Also, hazard 8 (H8) has a high number of nodes due to numerous code classes.

TABLE IV

| # | Hazard | Node CNT | SR | PR | DD | AJ | CX | AS | TS | SC |
|---|---|---|---|---|---|---|---|---|---|---|
| H1* | Incorrect GOTO command causes terrain crash | 49 | | | | | • | • | | • |
| H2* | Midair collision during flight execution | 28 | • | | | | • | | | |
| H3* | UAV flies above altitude allowed by the FAA | 7 | | • | | | • | | | |
| H4* | Physical failure of battery during flight | 29 | | | • | | | | • | • |

TABLE IV-continued

| # | Hazard | Node CNT | Changes in v2 | | | | | | | |
|---|---|---|---|---|---|---|---|---|---|---|
| | | | SR | PR | DD | AJ | CX | AS | TS | SC |
| H5* | Collision occurs between UAVs at takeoff | 58 | | | • | | • | | • | |
| H6* | Compass failure leading to localization error | 8 | • | | • | | | | | |
| H7 | Two UAVs collide when executing RTL commands | 20 | | | | | | | • | |
| H8 | Insufficient coverage during search and rescue | 259 | • | | • | | • | • | • | • |

Results of the analysis, summarized in Table IV, indicated that source code changes impacted five hazards' mitigations. In one case (H8), the effect was associated with new functionality that introduced an entirely new sub-tree of requirements, design definitions, and code. In two cases, the effect on hazard mitigations was the result of changes in the design (H4, H5). In two other cases, the effects were associated with context and/or assumption changes, (H1, H7). In H1, TLE identified underlying code refactorings. In two cases (H2 and H6), a new safety requirement was delegated entirely to an adjacent system (Ardupilot and Ground Control Station, respectively), which dramatically changed the system's response to those hazards. Also, in one case a contextual change led to a modification in a process requirement in order to assume responsibility for handling that hazard (H3).

Overall, the Dronology's individual hazards were impacted by changes to multiple artifact types, and the SAFA correctly detected and visualized all these changes, and also provided correct warnings and recommendations (as designed) in all cases. In some embodiments, the SAFA can be configured to display each change on the delta view as an independent entity (without grouping related changes, such as to indicate that a change in code was associated with a concurrent change in design). In other embodiments, however, the SAFE can be configured to group changes in this way to further aid analysts in understanding the impact of the identified changes.

VI. User Evaluation

A. Controlled User Study

A user study was also conducted to evaluate the SAFA. The study involved 10 participants with industry experience as listed in Table V (below). Table V provides a summary of the participants' professional experience showing years in the industry (Yrs) and whether they had experience in safety-critical projects.

TABLE V

| ID | Role | Domain | Yrs | SC |
|---|---|---|---|---|
| P1 | Software Engineer | Aviation & Defense | 8 | Y |
| P2 | Developer | Operating Systems | 1 | N |
| P3 | Developer | Development | 2+ | Y |
| P4 | Developer | Embedded Systems | 1 | N |
| P5 | Developer | Embedded Systems | 2 | Y |
| P6 | Software Engineer | Software Development | 7 | Y |
| P7 | Developer | Information Systems | 2 | N |
| P8 | Software Engineer | Unmanned Aerial Systems | 1 | Y |
| P9 | Systems Engineer | Embedded Systems | 35 | Y |
| P10 | Requirements Engineer | Defense Systems | 23 | Y |

At the start of the study, each participant viewed a 10 minute pre-recorded tutorial providing background on the study, the Dronology system, and information about safety arguments and SACs. For time purposes, six hazards were presented to each participant (keeping the study duration to 15 minutes of getting started and training and approximately 45 minutes for analysis of the safety hazards). The six hazards (from the 11 leaf hazards) were selected based on the following inclusion criterion: (IC-1) there should be a non-trivial change that affected the hazard between versions V1 and V2, (IC-2) there should be diversity of change types in the Safety Trees, and (IC-3) the Safety Tree should be of a size that is analyzable within 10 minutes. Five hazards were discarded due to IC-1 and one was discarded due to IC-3. The final hazards, labeled H1-H6 in Table IV (see hazards marked with asterisk), were selected in a way that maximized diversity (IC-2).

Hazards were presented to the participants in two different ways, referred to as treatments T1 and T2. In treatment T1, Artifact Tree pairs were used where the user was given simultaneous access (in two windows) to V1 and V2 artifact trees for the hazard under inspection. The user could click on any non-source code artifact to access the artifact's full data record (for example, in Jira). This treatment was designed to be similar to the current state of practice in which an analyst might assess change by retrieving two versions of the system in order to perform a comparison. In treatment T2, the delta view was used wherein the user was given access to the delta view produced by SAFA comparing the prior and current Safety Trees for each hazard. As with the previous treatment, the user could also click on nodes to view associated records.

The participants were divided as evenly as possible according to background and skill set into two groups (A and B). Hazards were assigned in the same order to both groups (H1-H6); however, group A participants used treatment T1 for hazards H1-H3 and treatment T2 for hazards H4-H6, while group B used treatment T2 for H1-H3 and treatment T1 for H4-H6.

Participants were instructed to assess the six hazards using a think-aloud protocol. They were then asked the following question which was designed to evaluate the extent to which SAFA supported the user in recognizing challenges to the validity of the safety case: (Q1) "With respect to this hazard, has the system changed in a way that potentially affects its safety? If so please explain your answer." After the participant had evaluated all six hazards, the participants answered three questions: (Q2) "Was the information provided to you for each of the two methods sufficient for assessing the impact of change upon system safety?"; (Q3) "Which of the two methods did you prefer using? Why?"; and finally (Q4) "Can you suggest any improvements for the Delta Views?." One scribe documented the think-aloud statements while a second scribe watched the subject while performing the tasks and took additional notes on interesting observations beyond the think-aloud protocol. Audio recordings were also collected of the participants.

B. Results

With respect to Q1, based on the clear use of color encoding to visualize changes in the system coupled with think-aloud protocol and the participants' use of the SAFA features to open up recommendations by clicking on specific nodes, participants were aware of all color encoded changes in the delta view. In contrast, participants inspecting changes using the paired artifact view only identified 80.6% of the potential problems.

After changes were identified, the participants discussed the impact of a change. For example, using the paired artifact method, participant P2 commented on hazard H6 that the design has "changed in a way that it now has to interface with an adjacent system therefore I would need to look at integration code." Similarly, using the Delta View for H6, on observing that two assumptions had been removed and one added, the participant commented that the "change in assumptions could create gaps" even though the new one "would improve safety."

However, one of the participants (P6) stated that visibility into modifications within artifacts (for example, source code changes or rewording of requirements) was not available in the paired Artifact Trees, and that using the paired artifact trees he would have missed the fact that several source code classes had been modified which should trigger a safety review.

With respect to Q2, all participants except one (P7), stated that they favored the Delta View over the artifact view. In fact one participant (P1), when asked to use treatment T1 after T2, specifically asked if he could have his delta view back. Another participant (P9) said that he would "kill to have this (delta view) in my work." In addition, the participants took significantly less time using the delta view to identify changes. Also, some participants (especially those with weak spatial skills) found it difficult to find differences in the paired Artifact Trees, especially in quite large trees. Also, participants frequently clicked on the informational (advice) icons and carefully read the recommendations generated by SAFA to describe the type of changes in the code. In one case, this allowed a participant to state that the change was "unlikely to impact safety" as it was a simple refactoring.

With respect to Q3 and Q4, the responses were inductively coded to identify prominent themes. In total, six themes for Q3 were identified with agreement on four, and two themes were identified for Q4. The themes emerging from user responses reported in Table VI (below) were selected for analysis.

TABLE VI

| Q | Theme | Description | Cnt |
|---|---|---|---|
| Q3 | Visualization | The extent to which color coding and other visualizations highlight issues | 6 |
| Q3 | Speed | The extent to which problems can be identified quickly | 6 |
| Q3 | Informative | The extent to which the provided information supports safety analysis | 5 |
| Q3 | Process | The ease of the analysis process | 5 |
| Q3 | Trust | The trust that a user places in SAFA to identify problems | 1 |

TABLE VI-continued

| Q | Theme | Description | Cnt |
|---|---|---|---|
| Q4 | Code insight | The ability of SAFA to identify and display impactful code changes | 3 |
| Q4 | Rationale | Rationales explaining additions, deletions, or modifications of artifacts | 2 |

As depicted in Table VI, six participants mentioned the benefits of visualization. For example, P1 stated that "color coding reduced confusion about what was new and not," and P9 stated that it was "easier to understand change." Six participants also mentioned the speed with which they were able to identify impactful changes in the delta view, using adjectives such as "quickly" and "at a glance." Five participants mentioned the informativeness of the delta view. For example, P4 stated that you "can see code change, and as soon as code changes, everything up becomes suspect," while P9 stated that it would "help us [ . . . ] figure out risks." Conversely, P3 stated that "it is too easy to miss changes" using the paired Artifact Trees (treatment T1). Five participants mentioned the simplification of the process using delta views. For example, P5 appreciated that it was "all in one place," while P1 noted that there was "no need to hunt between trees." With respect to Q4, many users discussed the actions they would take to investigate or resolve the safety concerns, such as, for example, questioning the validity of requirements (P10), identifying areas in which additional mitigations were needed (P9), investigating APIs (P6), and proposing additional acceptance tests (P1).

Accordingly, in summary, the delta view generated by the SAFA provides users with affordances to quickly identify changes that potentially impact the safety of a system. Furthermore, it helps users identify actionable steps needed to ensure system safety and to update the SAC. In some embodiments, the SAFA can also provide further benefits and insights such as by providing additional information regarding code changes, such as the ability to see whether input or output changes when code changes" before and after views of committed code or the complete history of commits between two versions. Similarly, the SAFA can be configured to provide rationales for additions and deletions to help explain the reasoning behind the change.

VII. Conclusion

As described herein, the SAFA automatically generates delta views that are designed to aid safety analysts and developers to identify changes that potentially impact system safety. As also described above, an embodiment of the SAFA as described herein was applied to two versions of the Dronology system and generated diverse warnings and recommendations commensurate with the types of changes existing between the two versions. Furthermore, the user study described herein demonstrates the usefulness of SAFA for detecting and analyzing the impact of change upon an existing Safety Tree over existing technology. In addition, once safety issues are addressed, the new version of the Safety Tree can be inserted into a SAC as evidence that a safety hazard is mitigated.

Figure 7:
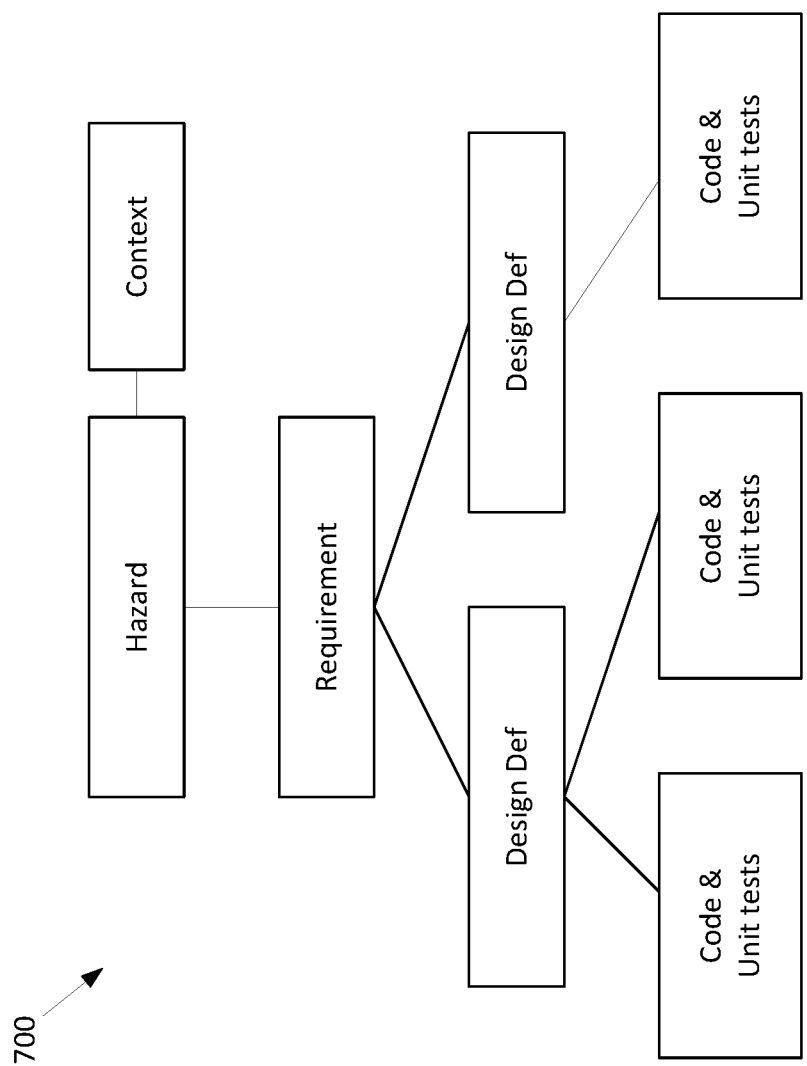
FIG. 7 illustrates an artifact tree view according to some embodiments.
Figure 8:
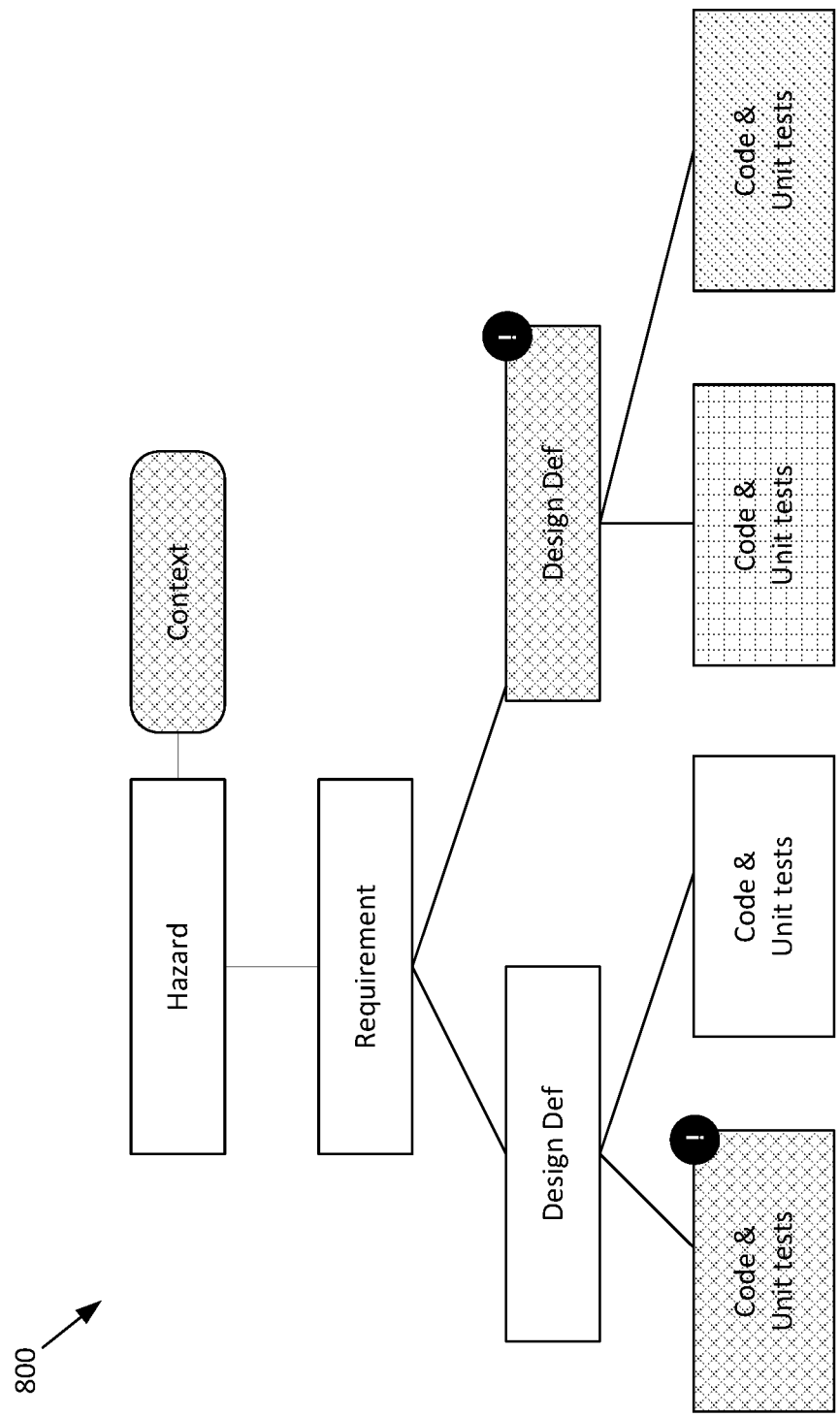
FIG. 8 illustrates a delta view according to some embodiments.

It should be understood that the workflows described and illustrated herein are provided as one example and other workflows are possible. For example, in some embodiments, the delta tree analysis can be performed on two artifact trees and a safety assurance case can be generated based on this analysis (or the analysis may link to an existing safety assurance case without inserting some or all types of safety assurance case nodes. For example, FIG. 7 illustrates an artifact tree view 700 according to some embodiments. The artifact tree view 700 is automatically generated and can represent an abstract view of a safety tree, such as the tree illustrated in FIG. 1. As described above, after generating the trees (such as the artifact tree view 700), safety assurance case nodes (for example, strategies, claims, and evidence nodes) can be inserted into the artifact view and a delta view can be generated by comparing two annotated trees. However, in other embodiments, the delta view (such as the delta view 800 illustrated in FIG. 8) can be generated by comparing two artifact views where no strategy nodes have been inserted. In some embodiments, warning nodes and action items (for example, the exclamation marks (!) as illustrated in FIG. 8) are still inserted in this embodiment although strategy nodes are not inserted.

Figure 9:
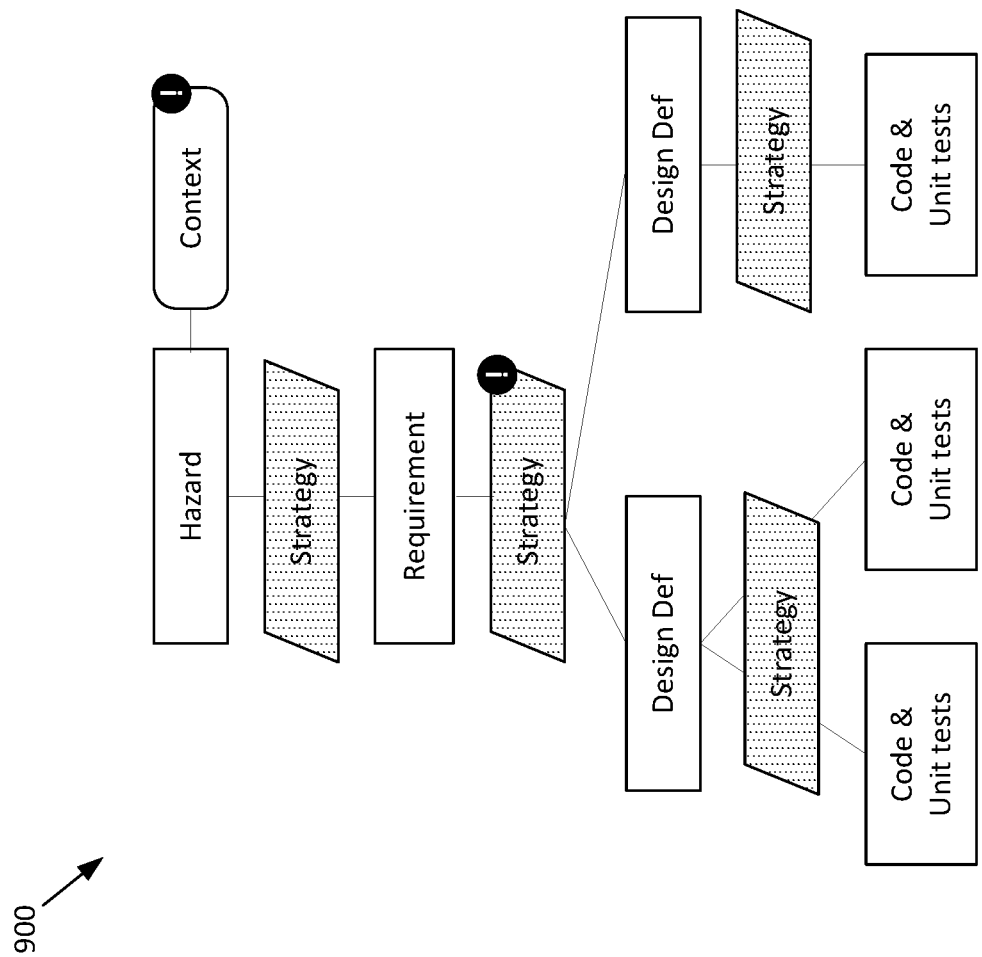
FIG. 9 illustrates a safety view according to some embodiments.

In this alternative embodiment, after the delta view is resolved, open issues are addressed, and the like, the final version is used to create a safety view, such as the safety view 900 illustrated in FIG. 9. To create the safety view one of two actions are taken: (1) inserting "actionable" safety assurance nodes or (2) integrating the safety view with an existing fault tree, an external safety assurance case, a Failure Mode Effects and Criticality Analysis (FMECAs), or the like. When "actionable" safety assurance nodes are inserted, the inserted nodes represent "tentative claims" that must be affirmed or refuted (and fixed) by the user. In some embodiments, this annotated view is automatically generated.

Figure 10:
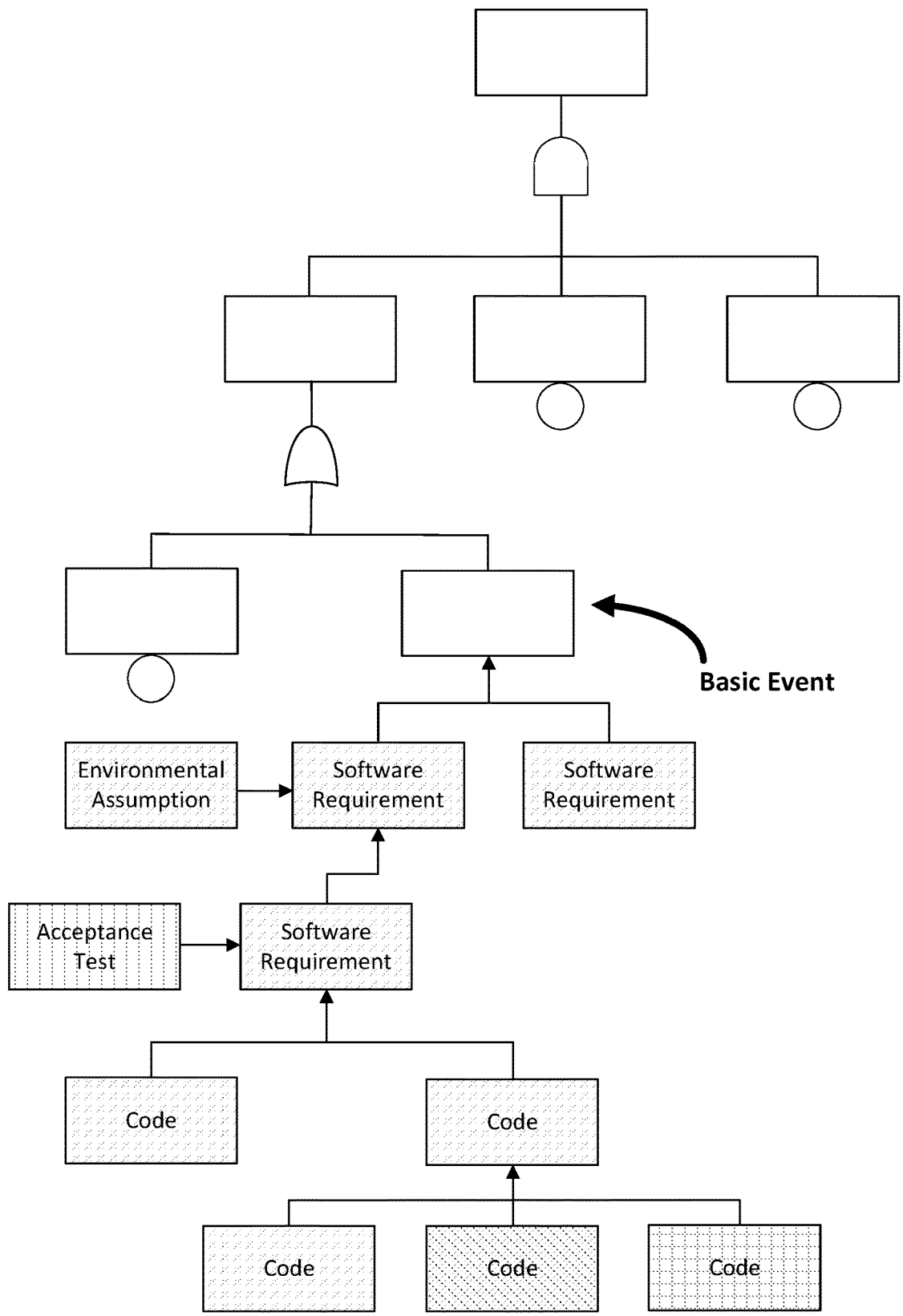
FIG. 10 illustrates a SAFA integrated with a fault tree according to some embodiments.
Figure 11:
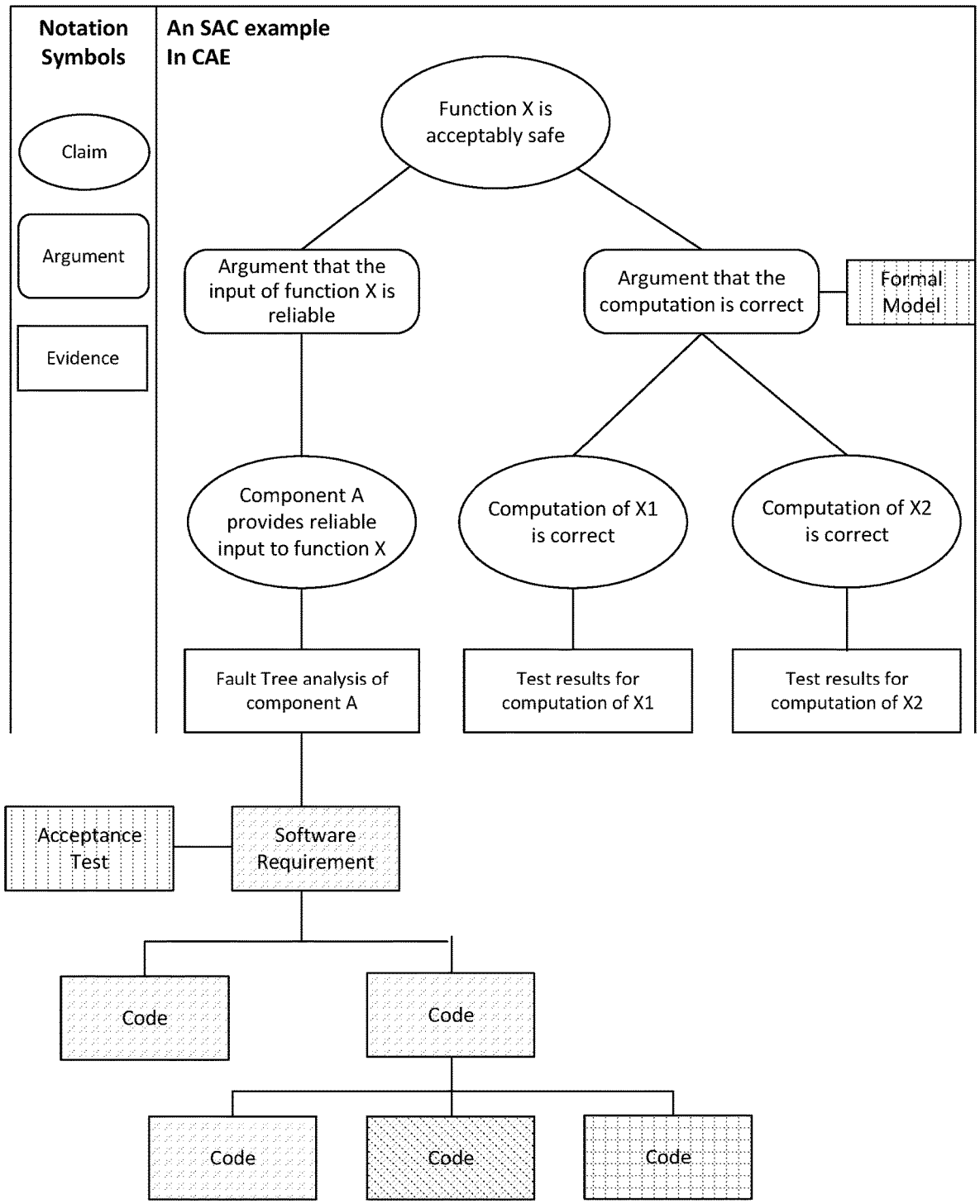
FIG. 11 illustrates a SAFA integrated with an external safety assurance case according to some embodiments.
Figure 12:
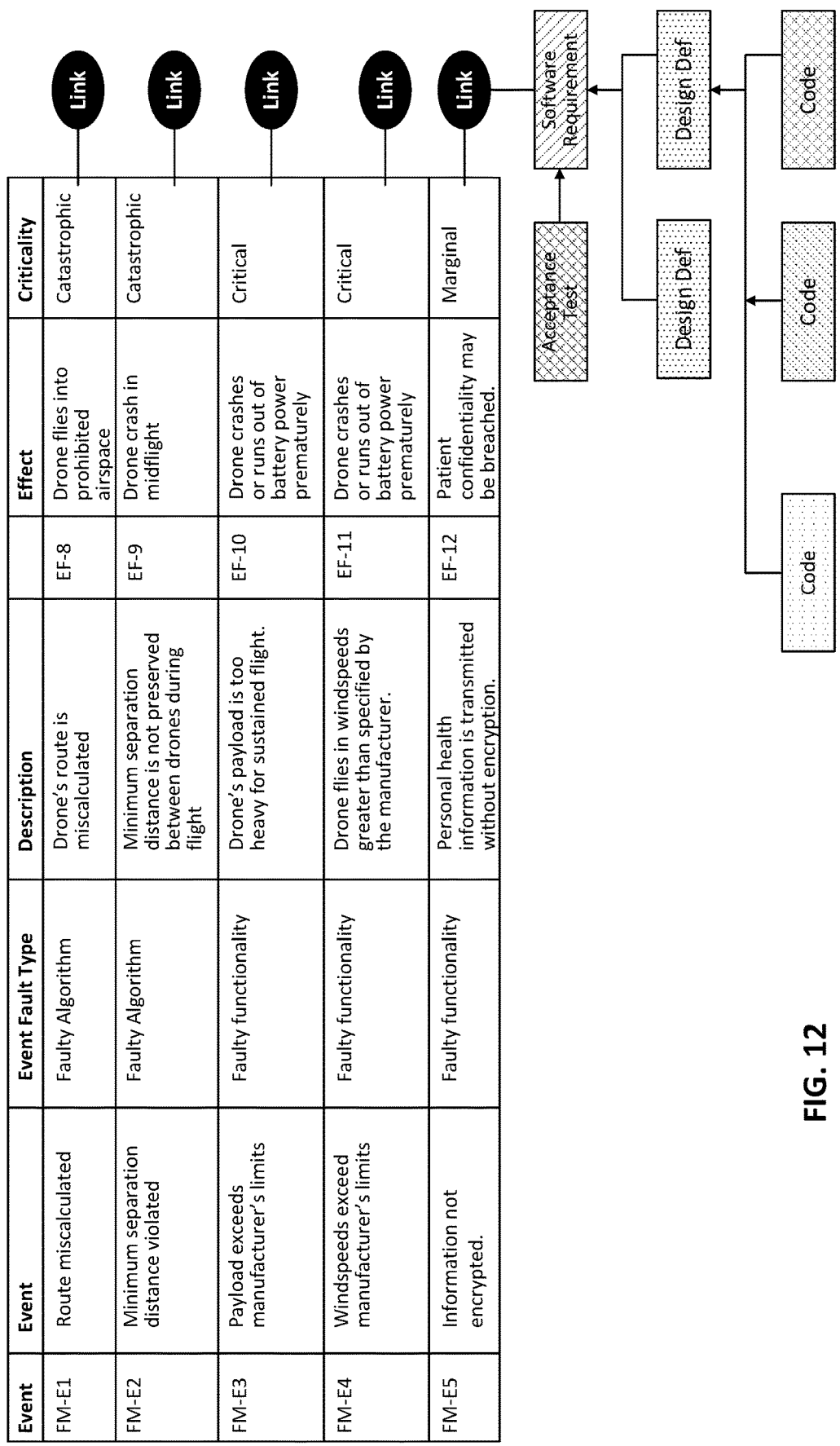
FIG. 12 illustrates a SAFA integrated with a Failure Mode Effects and Criticality Analysis (FMECA) according to some embodiments.

Alternatively, with respect to the integrating step, many industries use fault trees, which represent a standard way of modeling faults and mitigations. Accordingly, embodiments described herein can integrate SAFA with existing fault trees as illustrated in FIG. 10. In particular, FIG. 10 illustrates a fault tree at the top (hollow nodes that would have labels in them). The basic event shown above is linked to two subsystem requirements. Those subsystem requirements are part of one or more artifact trees. Embodiments described herein can attach the subtrees to the overall graph creating (1) artifact trees and (2) delta trees. In this embodiment, a safety analyst can then evaluate the impact of any change on the fault tree (the system safety). Similarly, as illustrated in FIG. 11, SAFA artifacts (artifact tree and delta view) can be integrated at multiple integration points into a safety assurance case. Furthermore, as illustrated in FIG. 12, SAFA artifacts (artifact tree and delta view) can be integrated at multiple integration points into a FMECA. In some embodiments, associated SAFA trees are hidden unless requested by the user. For example, as illustrated in FIG. 12, each fault (each row in the FMECA table) can link to at least one artifact/delta subtree but a user can select which linked tress are "open" for viewing. In the illustrated embodiment in FIG. 12, the bottom link is currently "open" for viewing.

Figure 13:
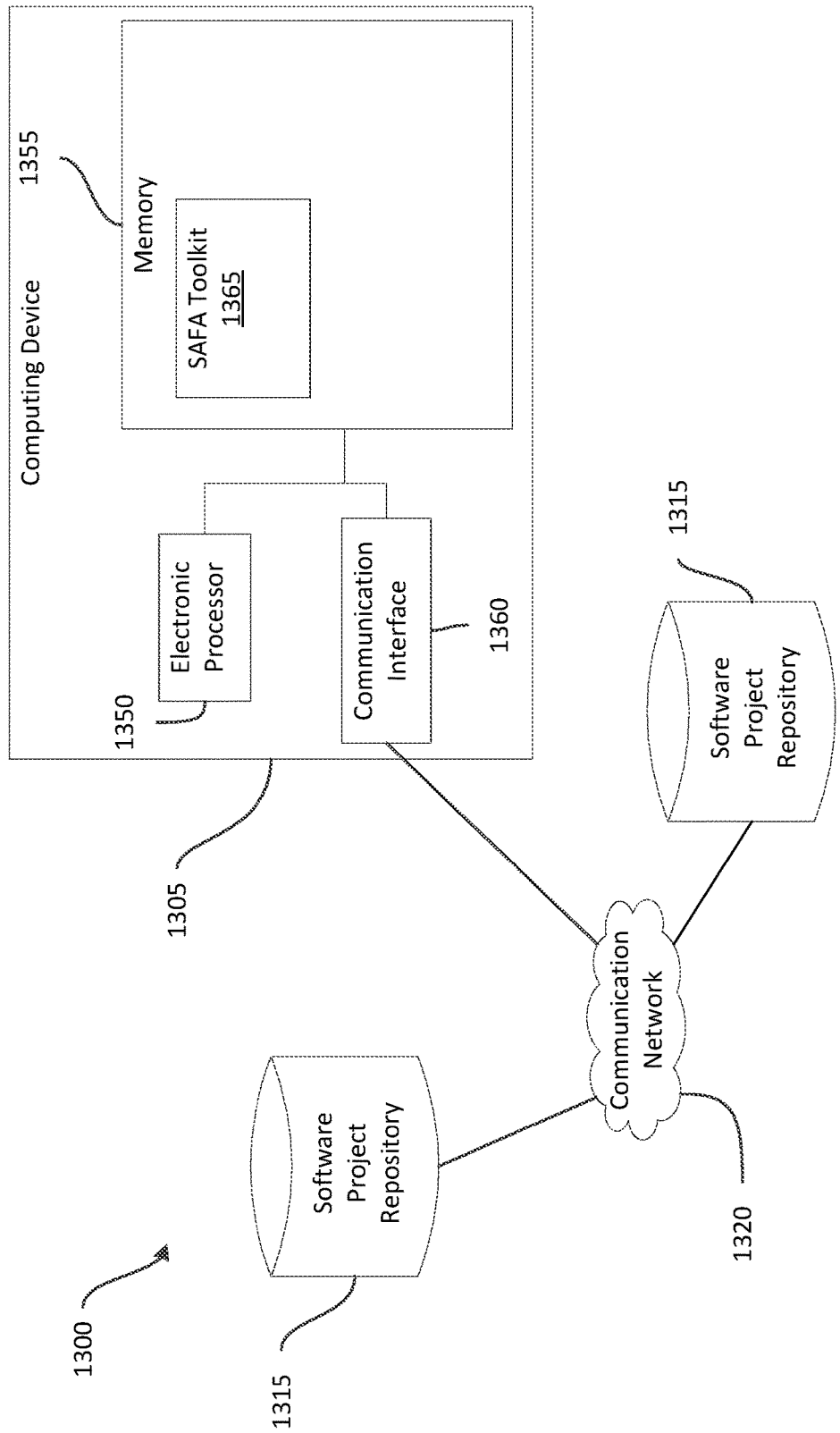
FIG. 13 schematically illustrates a system configured to perform the SAFA process described herein according to some embodiments.

It should be understood that the functionality described herein can be performed via one or more computing devices, communication networks, and the like. For example, FIG. 13 illustrates a system 1300 for implementing the SAFA as described herein according to some embodiments. As illustrated in FIG. 13, the system 1300 includes a computing device 1305, such as a server, and one or more software project management systems or repositories 1315 (Jira, DOORS, GitHub, Bitbucket, or the like). The computing device 1305 and the software project repositories 1315 communicate over one or more wired or wireless communication networks 1320. Portions of the wireless communication networks 1320 may be implemented using a wide area network, such as the Internet, a local area network, such as a Bluetooth™ network or Wi-Fi, and combinations or derivatives thereof. It should be understood that the system 1300 may include more or fewer computing devices and the specific configuration of devices illustrated in FIG. 13 is purely for illustrative purposes. For example, in some embodiments, the functionality described herein is performed via a plurality of computing device, such as a plurality of devices in a distributed or cloud-computing environment. Also, in some embodiments, the functionality described herein as being performed by the computing device 1305 may be performed as part of a software project system or repository 1315. Also, in some embodiments, the components illustrated in the system 1300 may communicate through one or more intermediary devices (not shown).

As noted above, the software project repositories 1315 can store a TIM, hazard descriptions, requirements, design definitions, environmental assumptions, acceptance test descriptions, context information, code, unit tests, acceptance test results logs, or combinations thereof. Accordingly, the one or more repositories 1315 store the data used by the SAFA to create the Artifact Trees representing a particular version of a system.

As illustrated in FIG. 13, the computing device 1305 includes an electronic processor 1350, a memory 1355, and a communication interface 1360. The electronic processor 1325, the memory 1330, and the communication interface 1360 communicate wirelessly, over wired communication channels or buses, or a combination thereof. The computing device 1305 may include additional components than those illustrated in FIG. 13 in various configurations. For example, in some embodiments, the computing 1305 includes multiple electronic processors, multiple memory modules, multiple communication interfaces, or a combination thereof. Also, as previously noted, it should be understood that the functionality described herein as being performed by the computing device 1305 may be performed in a distributed nature by a plurality of computers located in one or more geographic locations.

The electronic processor 1350 may be a microprocessor, an application-specific integrated circuit (ASIC), and the like. The electronic processor 1350 is generally configured to execute software instructions to perform a set of functions, including the functions (the SAFA) described herein. The memory 1355 includes a non-transitory computer-readable medium and stores data, including instructions executable by the electronic processor 1350. The communication interface 1360 may be, for example, a wired or wireless transceiver or port, for communicating over the communication network 1320 and, optionally, one or more additional communication networks or connections.

As illustrated in FIG. 13, the memory 1355 includes the SAFA toolkit 1365 as described herein. It should be understood that, in some embodiments, the functionality described herein as being provided by the SAFA toolkit may be distributed and combined in various configurations, such as through multiple separate software applications. In some embodiments, output generated via the SAFA toolkit 1365, such as Artifact Trees, Safety Trees, Artifact Forests, Safety Forests, and delta views can be stored, such as in the memory 1355 or one or more other storage locations within the computing device 1305 or external to the computing device 1305. In some embodiments, the computing device 1305 also includes or communicates with one or more input/output devices, such as a display device, a keyboard, a mouse, a printer, a speaker, a microphone, a touchscreen, etc. to receive user input, provide user output, or a combination thereof. For example, the visualization described herein may be provided to a display device included in the computing device 1305 or to a display device in a separate computing device, such as a client device communicating with the computing device 1305.

Accordingly, embodiments described herein provide a software-based tool designed to help developers and safety analysts build and maintain safety cases as their products evolve through a series of releases. The safety case is designed to show that identified hazards have been mitigated in the design and code, and that there is diverse evidence in the form of test cases, simulations, reviews, or a combination thereof. Some embodiments of the tool visualize the impact of a hazard upon the system and provide warnings and recommendations when issues are identified. After a safety case is constructed for one release of the software, embodiments of the tool can visually depict changes in requirements, design, code, and other artifacts. Also, some embodiments of the tool analyze the changes and provide insights to help the project team determine whether or not the change impacts system safety. In addition, some embodiments of the tool provide guidance and support for modifying the system to achieve safety and for evolving a previous safety case for use with a new release. It should be understood that although embodiments have been described herein with respect to particular industries (for example, UAVs), the methods and systems described herein are applicable to many different industries and types of systems that have safety concerns.

Various features and advantages of some embodiments are set forth in the following claims.

What is claimed is:

1. A method for maintaining the safety of a software-based system, the method comprising:
   automatically generating a first artifact tree for a hazard for a first version of the software-based system by recursively following traceability paths defined by a model for a plurality of artifacts associated with mitigating the hazard, the traceability paths representing links between the plurality of artifacts, the first artifact tree representing a hierarchical structure of the first version of the software including requirements and code of the first version of the software addressing a hazard;
   automatically transforming the first artifact tree into a first augmented tree using a set of heuristics, the set of heuristics automatically inserting one or more augmentation nodes into the first artifact tree;
   automatically generating a second artifact tree for the hazard for a second version of the software-based system by recursively following the traceability paths defined by the model;
   automatically transforming the second artifact tree for the hazard into a second augmented tree using the set of heuristics, the set of heuristics automatically inserting one or more augmentation nodes into the second artifact tree;
   automatically, with an electronic processor, comparing the first augmented tree and the second augmented tree to generate a delta view;
   automatically, with the electronic processor, creating at least one candidate trace link for the software-based system based on the delta view to maintain safety of the second version of the software-based system; and
   modify the software-based system based on the created at least one candidate trace link.

2. The method of claim 1, wherein the links represented by the traceability paths are created manually, created automatically, or mined from commit messages.

3. The method of claim 1, wherein automatically transforming the first artifact tree into the first augmented tree using the set of heuristics includes automatically inserting at least one selected from a group consisting of a claims node, a strategies node, an assumption node, and a solution node into the first artifact tree.

4. The method of claim 1, further comprising inserting at least a portion of the first augmented tree into a safety assurance case.

5. The method of claim 1, further comprising automatically generating at least one warning based on the first augmented tree.

6. The method of claim 1, further comprising automatically generating at least one actionable recommendation based on the first augmented tree.

7. The method of claim 1, wherein the delta view identifies at least one artifact added for the second version of the software-based system as compared to the first version of the software-based system.

8. The method of claim 1, wherein the delta view identifies at least one artifact modified for the second version of the software-based system as compared to the first version of the software-based system.

9. The method of claim 1, wherein the delta view identifies at least one artifact deleted for the second version of the software-based system as compared to the first version of the software-based system.

10. The method of claim 1, wherein the delta view identifies at least one link added for the second version of the software-based system as compared to the first version of the software-based system.

11. The method of claim 1, wherein the delta view identifies at least one link modified for the second version of the software-based system as compared to the first version of the software-based system.

12. The method of claim 1, wherein the delta view identifies at least one link deleted for the second version of the software-based system as compared to the first version of the software-based system.

13. The method of claim 1, further comprising interfacing with at least one project repository for the software-based system to generate the first artifact tree.

14. The method of claim 1, further comprising generating and outputting a visualization based on the delta view.

15. The method of claim 14, wherein each of a plurality of nodes included in the visualization is displayed differently based on whether each of plurality of nodes was added, modified, or deleted.

16. The method of claim 15, wherein each of the plurality of nodes included in the visualization is displayed differently using color coding.

17. The method of claim 14, wherein at least one node included in the visualization is marked with a safety warning.

18. The method of claim 14, wherein at least one node included in the visualization is marked with an actionable recommendation.

19. A system for maintaining the safety of a software-based system, the system comprising:
   at least one electronic processor configured to
      automatically generate a first artifact tree for a hazard for a first version of the software-based system by recursively following traceability paths defined by a model for a plurality of artifacts associated with mitigating the hazard, the traceability paths representing links between the plurality of artifacts, the first artifact tree representing a hierarchical structure of the first version of the software including requirements and code of the first version of the software addressing a hazard;

automatically transform the first artifact tree into a first augmented tree using a set of heuristics, the set of heuristics automatically inserting one or more augmentation nodes into the first artifact tree;

automatically generate a second artifact tree for the hazard for a second version of the software-based system by recursively following the traceability paths defined by the model;

automatically transform the second artifact tree for the hazard into a second augmented tree using the set of heuristics, the set of heuristics automatically inserting one or more augmentation nodes into the second artifact tree;

automatically compare the first augmented tree and the second augmented tree to generate a delta view;

automatically create at least one candidate trace link for the software-based system based on the delta view to maintain safety of the second version of the software-based system; and modify the software-based system based on the created at least one candidate trace link.

20. Non-transitory computer readable medium including instructions that, when executed by at least one electronic processor, perform a set of functions, the set of functions comprising:

automatically generating a first artifact tree for a hazard for a first version of a software-based system by recursively following traceability paths defined by a model for a plurality of artifacts associated with mitigating the hazard, the traceability paths representing links between the plurality of artifacts, the first artifact tree representing a hierarchical structure of the first version of the software including requirements and code of the first version of the software addressing a hazard;

automatically transforming the first artifact tree into a first augmented tree using a set of heuristics, the set of heuristics automatically inserting one or more augmentation nodes into the first artifact tree;

automatically generating a second artifact tree for the hazard for a second version of the software-based system by recursively following the traceability paths defined by the model;

automatically transforming the second artifact tree for the hazard into a second augmented tree using the set of heuristics, the set of heuristics automatically inserting one or more augmentation nodes into the second artifact tree;

automatically comparing the first augmented tree and the second augmented tree to generate a delta view;

automatically creating at least one candidate trace ink for the software-based system based on the delta view to maintain safety of the second version of the software-based system; and modifying the software-based system based on the created at least one candidate trace link.

* * * * *